(12) United States Patent
Aradachi et al.

(10) Patent No.: US 11,399,573 B2
(45) Date of Patent: Aug. 2, 2022

(54) POWER SUPPLY UNIT FOR AEROSOL GENERATION DEVICE

(71) Applicant: Japan Tobacco Inc., Tokyo (JP)

(72) Inventors: Takao Aradachi, Tokyo (JP); Takeshi Akao, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 17/464,707

(22) Filed: Sep. 2, 2021

(65) Prior Publication Data

US 2022/0071308 A1 Mar. 10, 2022

(30) Foreign Application Priority Data

Sep. 7, 2020 (JP) .............................. JP2020-150104

(51) Int. Cl.

| | |
|---|---|
| *H02J 7/00* | (2006.01) |
| *A24F 40/90* | (2020.01) |
| *A24F 40/53* | (2020.01) |
| *A24F 40/40* | (2020.01) |
| *A24F 40/57* | (2020.01) |
| *H01M 50/247* | (2021.01) |

(52) U.S. Cl.
CPC .............. *A24F 40/90* (2020.01); *A24F 40/40* (2020.01); *A24F 40/53* (2020.01); *A24F 40/57* (2020.01); *H01M 50/247* (2021.01); *H02J 7/0034* (2013.01); *H02J 7/0042* (2013.01); *H02J 7/00714* (2020.01); *H01M 2220/30* (2013.01)

(58) Field of Classification Search
CPC .................................................... A24F 40/90

USPC ......................................................... 320/134
See application file for complete search history.

(56) References Cited

U.S. PATENT DOCUMENTS

| | | | |
|---|---|---|---|
| 4,197,582 A | 4/1980 | Johnston et al. | |
| 5,878,752 A | 3/1999 | Adams et al. | |
| 6,012,103 A | 1/2000 | Sartore et al. | |
| 6,073,193 A | 6/2000 | Yap | |

(Continued)

FOREIGN PATENT DOCUMENTS

| | | |
|---|---|---|
| CN | 203689071 U | 7/2014 |
| CN | 105476068 A | 4/2016 |

(Continued)

OTHER PUBLICATIONS

Notice of Reasons for Refusal dated Dec. 4, 2020, received for JP Application 2020-150103, 11 pages including English Translation.

(Continued)

*Primary Examiner* — Yalkew Fantu

(74) *Attorney, Agent, or Firm* — Xsensus LLP

(57) ABSTRACT

A power supply unit for an aerosol generation device is provided. The power supply unit includes an internal power supply configured to hold power supplied to a heater configured to heat an aerosol source, a first connector connectable to an external power supply including a second connector including a first power supply terminal and a second power supply terminal, the first connector including a third power supply terminal and a fourth power supply terminal, and a polarity unification circuit. The polarity unification circuit includes four diodes to enable the first connector to be connected to the second connector of the external power supply in different directions.

11 Claims, 6 Drawing Sheets

(56) References Cited

U.S. PATENT DOCUMENTS

| | | | |
|---|---|---|---|
| 6,101,076 A | 8/2000 | Tsai et al. |
| 6,249,825 B1 | 6/2001 | Sartore et al. |
| 6,279,060 B1 | 8/2001 | Luke et al. |
| 6,415,342 B1 | 7/2002 | Wahl et al. |
| 6,493,770 B1 | 12/2002 | Sartore et al. |
| 6,647,452 B1 | 11/2003 | Sonoda |
| 6,671,814 B1 | 12/2003 | Kubo et al. |
| 6,946,817 B2 | 9/2005 | Fischer et al. |
| 7,085,876 B2 | 8/2006 | Lai et al. |
| 7,340,627 B1 | 3/2008 | Harvey |
| 8,299,719 B1 | 10/2012 | Moshirnoroozi |
| 8,352,644 B2 | 1/2013 | Malamant et al. |
| 8,412,857 B2 | 4/2013 | Ady et al. |
| 8,736,227 B2 | 5/2014 | Chadbourne et al. |
| 8,868,816 B2 | 10/2014 | Kim |
| 8,937,460 B2 | 1/2015 | Chen et al. |
| 9,047,808 B2 | 6/2015 | Cho et al. |
| 9,439,454 B2 | 9/2016 | Fernando et al. |
| 9,439,455 B2 * | 9/2016 | Alarcon .................. A24F 40/51 |
| 9,477,288 B2 | 10/2016 | Yang |
| 9,549,573 B2 | 1/2017 | Monsees et al. |
| 9,577,452 B2 | 2/2017 | Kuan |
| 9,692,253 B2 | 6/2017 | Jeong et al. |
| 9,848,655 B2 | 12/2017 | Fernando et al. |
| 9,851,735 B2 | 12/2017 | Bard et al. |
| 9,907,337 B2 | 3/2018 | Alarcon et al. |
| 9,907,338 B2 | 3/2018 | Alarcon et al. |
| 9,980,514 B2 | 5/2018 | Malamud et al. |
| 10,008,871 B2 | 6/2018 | Xiang |
| 10,045,567 B2 | 8/2018 | Monsees et al. |
| 10,045,568 B2 | 8/2018 | Monsees et al. |
| 10,051,893 B2 | 8/2018 | Hoffman et al. |
| 10,058,124 B2 | 8/2018 | Monsees et al. |
| 10,058,129 B2 | 8/2018 | Monsees et al. |
| 10,076,139 B2 | 9/2018 | Monsees et al. |
| 10,117,465 B2 | 11/2018 | Monsees et al. |
| 10,117,466 B2 | 11/2018 | Monsees et al. |
| 10,130,123 B2 | 11/2018 | Hatton et al. |
| 10,130,780 B2 | 11/2018 | Talon |
| 10,141,854 B1 | 11/2018 | Butler et al. |
| 10,143,232 B2 | 12/2018 | Talon |
| 10,218,193 B2 | 2/2019 | Gratton |
| 10,236,708 B2 | 3/2019 | Schennum et al. |
| 10,264,823 B2 | 4/2019 | Monsees et al. |
| 10,333,330 B2 | 6/2019 | Holzherr |
| 10,398,170 B2 | 9/2019 | Fernando et al. |
| 10,449,310 B2 | 10/2019 | Jackson et al. |
| 10,483,781 B2 | 11/2019 | Holzherr |
| 10,517,326 B2 | 12/2019 | Sur et al. |
| 10,536,013 B2 | 1/2020 | Gratton |
| 10,638,795 B2 | 5/2020 | Alarcon et al. |
| 10,653,187 B1 | 5/2020 | Doyle et al. |
| 10,667,560 B2 | 6/2020 | Atkins et al. |
| 10,674,770 B2 | 6/2020 | Talon |
| 10,701,975 B2 | 7/2020 | Bowen et al. |
| 10,716,192 B1 | 7/2020 | Tsibulevskiy |
| 10,770,913 B2 | 9/2020 | Schennum et al. |
| 10,842,194 B2 | 11/2020 | Batista et al. |
| 10,873,196 B2 | 12/2020 | Gratton |
| 10,888,122 B2 | 1/2021 | Malamud et al. |
| 10,888,125 B2 | 1/2021 | Anderson et al. |
| 10,912,331 B2 | 2/2021 | Atkins et al. |
| 10,912,333 B2 | 2/2021 | Atkins et al. |
| 10,931,130 B2 | 2/2021 | Akao |
| 10,966,462 B2 | 4/2021 | Alarcon et al. |
| 10,973,258 B2 | 4/2021 | Alarcon et al. |
| 10,980,276 B2 | 4/2021 | Alarcon et al. |
| 10,986,867 B2 | 4/2021 | Bowen et al. |
| 10,993,471 B2 | 5/2021 | Christensen et al. |
| 11,013,269 B2 | 5/2021 | Alarcon et al. |
| 11,019,685 B2 | 5/2021 | Bowen et al. |
| 11,026,450 B2 | 6/2021 | Alarcon et al. |
| 11,031,801 B2 | 6/2021 | Akao |
| 11,083,225 B2 | 8/2021 | Holzherr |
| 11,094,993 B2 | 8/2021 | Sur |
| 11,096,419 B2 | 8/2021 | Sur |
| 11,103,013 B2 | 8/2021 | Bagai et al. |
| 11,106,773 B2 | 8/2021 | Popplewell et al. |
| 11,129,420 B2 | 9/2021 | Tatsuta et al. |
| 11,133,692 B2 | 9/2021 | Akao |
| 11,147,316 B2 | 10/2021 | Farine et al. |
| 11,154,095 B2 | 10/2021 | Alarcon et al. |
| 11,160,936 B2 | 11/2021 | Bache et al. |
| 11,202,342 B2 | 12/2021 | Takeuchi et al. |
| 11,224,255 B2 | 1/2022 | Fernando et al. |
| 2003/0054703 A1 | 3/2003 | Fischer et al. |
| 2004/0145583 A1 | 7/2004 | Morita |
| 2004/0148451 A1 | 7/2004 | Lai et al. |
| 2005/0057223 A1 | 3/2005 | Harada |
| 2005/0228934 A1 | 10/2005 | Tsutsui |
| 2006/0015670 A1 | 1/2006 | Cinkler et al. |
| 2006/0231112 A1 | 10/2006 | Pittman et al. |
| 2007/0264983 A1 | 11/2007 | Chen et al. |
| 2009/0204735 A1 | 8/2009 | Chen et al. |
| 2009/0230117 A1 | 9/2009 | Fernando et al. |
| 2010/0052615 A1 | 3/2010 | Loncarevic |
| 2010/0121507 A1 | 5/2010 | Ishii et al. |
| 2010/0219790 A1 | 9/2010 | Chadbourne et al. |
| 2011/0265806 A1 | 11/2011 | Alarcon et al. |
| 2011/0316472 A1 | 12/2011 | Han et al. |
| 2012/0091958 A1 | 4/2012 | Ichikawa et al. |
| 2012/0139474 A1 | 6/2012 | Cho et al. |
| 2012/0205979 A1 | 8/2012 | Gaalaas et al. |
| 2012/0293136 A1 | 11/2012 | Chen et al. |
| 2013/0119922 A1 | 5/2013 | Chen et al. |
| 2013/0166928 A1 | 6/2013 | Yang |
| 2013/0284192 A1 | 10/2013 | Peleg et al. |
| 2013/0319439 A1 | 12/2013 | Gorelick et al. |
| 2013/0340775 A1 | 12/2013 | Juster et al. |
| 2014/0239886 A1 | 8/2014 | Lalitnuntikul et al. |
| 2014/0345606 A1 | 11/2014 | Talon |
| 2015/0053214 A1 | 2/2015 | Alarcon et al. |
| 2015/0059779 A1 | 3/2015 | Alarcon et al. |
| 2015/0208731 A1 | 7/2015 | Malamud et al. |
| 2015/0230521 A1 | 8/2015 | Talon |
| 2015/0249356 A1 | 9/2015 | Cho et al. |
| 2016/0164321 A1 | 6/2016 | Kuan |
| 2016/0174611 A1 | 6/2016 | Monsees et al. |
| 2016/0211693 A1 | 7/2016 | Stevens et al. |
| 2016/0226286 A1 | 8/2016 | Xiang |
| 2016/0242466 A1 | 8/2016 | Lord et al. |
| 2016/0336741 A1 | 11/2016 | Chen et al. |
| 2016/0344206 A1 | 11/2016 | Ono |
| 2016/0345634 A1 | 12/2016 | Fernando et al. |
| 2016/0345635 A1 | 12/2016 | Fernando et al. |
| 2017/0027234 A1 | 2/2017 | Farine et al. |
| 2017/0033568 A1 | 2/2017 | Holzherr |
| 2017/0119052 A1 | 5/2017 | Williams et al. |
| 2017/0170974 A1 | 6/2017 | Kang et al. |
| 2017/0207499 A1 | 7/2017 | Leadley |
| 2017/0214261 A1 | 7/2017 | Gratton |
| 2017/0222468 A1 | 8/2017 | Schennum et al. |
| 2017/0245547 A1 | 8/2017 | Lipowicz |
| 2017/0273358 A1 | 9/2017 | Batista et al. |
| 2018/0027878 A1 | 2/2018 | Dendy et al. |
| 2018/0043114 A1 | 2/2018 | Bowen et al. |
| 2018/0093054 A1 | 4/2018 | Bowen et al. |
| 2018/0140021 A1 | 5/2018 | Alarcon et al. |
| 2018/0146712 A1 | 5/2018 | Alarcon et al. |
| 2018/0192709 A1 | 7/2018 | Alarcon et al. |
| 2018/0213844 A1 * | 8/2018 | Sur ....................... H01M 4/525 |
| 2018/0242645 A1 | 8/2018 | Alarcon et al. |
| 2018/0263295 A1 | 9/2018 | Malamud et al. |
| 2018/0271156 A1 | 9/2018 | Alarcon et al. |
| 2018/0368474 A1 | 12/2018 | Bache et al. |
| 2019/0033937 A1 | 1/2019 | Inoue |
| 2019/0059448 A1 | 2/2019 | Talon |
| 2019/0131878 A1 | 5/2019 | Mizuno |
| 2019/0157887 A1 | 5/2019 | Gratton |
| 2019/0181675 A1 | 6/2019 | Schennum et al. |
| 2019/0212795 A1 | 7/2019 | Moritomo |
| 2019/0240430 A1 | 8/2019 | Jackson et al. |
| 2019/0252888 A1 | 8/2019 | Holzherr |
| 2019/0263279 A1 | 8/2019 | Kyojo et al. |

(56) References Cited

U.S. PATENT DOCUMENTS

| | | |
|---|---|---|
| 2019/0272359 A1 | 9/2019 | Popplewel et al. |
| 2019/0296505 A1 | 9/2019 | Harito et al. |
| 2019/0380390 A1 | 12/2019 | Jeong et al. |
| 2019/0380392 A1 | 12/2019 | Fernando et al. |
| 2019/0380394 A1 | 12/2019 | Takeuchi et al. |
| 2019/0380395 A1 | 12/2019 | Takeuchi et al. |
| 2019/0387801 A1 | 12/2019 | Takeuchi et al. |
| 2019/0387806 A1 | 12/2019 | Nakano et al. |
| 2020/0001027 A1 | 1/2020 | Jackson et al. |
| 2020/0006950 A1 | 1/2020 | Holzherr |
| 2020/0127478 A1 | 4/2020 | Gratton |
| 2020/0128883 A1* | 4/2020 | Yamada ............ A61M 15/009 |
| 2020/0128884 A1 | 4/2020 | Yamada et al. |
| 2020/0146344 A1 | 5/2020 | Contreras |
| 2020/0196670 A1 | 6/2020 | Alarcon et al. |
| 2020/0212517 A1* | 7/2020 | Akao ................ H01M 10/488 |
| 2020/0221780 A1 | 7/2020 | Qiu et al. |
| 2020/0229502 A1 | 7/2020 | Akao |
| 2020/0229503 A1 | 7/2020 | Akao |
| 2020/0229505 A1 | 7/2020 | Akao |
| 2020/0235599 A1 | 7/2020 | Akao |
| 2020/0237009 A1 | 7/2020 | Akao et al. |
| 2020/0237011 A1 | 7/2020 | Akao et al. |
| 2020/0237015 A1 | 7/2020 | Yamada et al. |
| 2020/0245691 A1 | 8/2020 | Yamada et al. |
| 2020/0275703 A1 | 9/2020 | Takeuchi et al. |
| 2020/0275704 A1 | 9/2020 | Takeuchi et al. |
| 2020/0275711 A9 | 9/2020 | Alarcon et al. |
| 2020/0300037 A1 | 9/2020 | Blair et al. |
| 2020/0305508 A1 | 10/2020 | Talon |
| 2020/0329766 A1 | 10/2020 | Doyle et al. |
| 2020/0329775 A1 | 10/2020 | Doyle et al. |
| 2020/0350773 A1 | 11/2020 | Fernando |
| 2020/0350783 A1 | 11/2020 | Schennum et al. |
| 2020/0352249 A1 | 11/2020 | Achtien et al. |
| 2020/0352254 A1 | 11/2020 | Yamada et al. |
| 2020/0352255 A1 | 11/2020 | Jeong et al. |
| 2020/0358300 A1 | 11/2020 | Akao et al. |
| 2020/0375011 A1 | 11/2020 | Tsibulevskiy |
| 2020/0375260 A1 | 12/2020 | Mizuguchi et al. |
| 2020/0383378 A1 | 12/2020 | Moloney et al. |
| 2021/0068465 A1 | 3/2021 | Malamud et al. |
| 2021/0106066 A1 | 4/2021 | Hamaguchi |
| 2021/0110022 A1 | 4/2021 | Russell et al. |
| 2021/0127746 A1 | 5/2021 | Tatsuta et al. |
| 2021/0127754 A1 | 5/2021 | Tatsuta et al. |
| 2021/0135470 A1 | 5/2021 | Gratton |
| 2021/0138490 A1 | 5/2021 | Alarcon et al. |
| 2021/0143658 A1 | 5/2021 | Akao |
| 2021/0161211 A1 | 6/2021 | Akao et al. |
| 2021/0194287 A1 | 6/2021 | Qu |
| 2021/0195961 A1 | 7/2021 | Marubashi et al. |
| 2021/0212384 A1 | 7/2021 | Alarcon et al. |
| 2021/0242702 A1 | 8/2021 | Akao |
| 2021/0242706 A1 | 8/2021 | Qu et al. |
| 2021/0258043 A1 | 8/2021 | Rohleder et al. |
| 2021/0259323 A1 | 8/2021 | Marubashi et al. |
| 2021/0307410 A1 | 10/2021 | Alarcon et al. |
| 2021/0313846 A1 | 10/2021 | Yang et al. |
| 2021/0329974 A1 | 10/2021 | Holzherr |
| 2021/0337880 A1 | 11/2021 | Alarcon et al. |
| 2022/0006303 A1 | 1/2022 | Chen et al. |
| 2022/0006312 A1 | 1/2022 | Zhang et al. |
| 2022/0006381 A1 | 1/2022 | Zhang et al. |
| 2022/0023550 A1 | 1/2022 | Bache et al. |

FOREIGN PATENT DOCUMENTS

| | | |
|---|---|---|
| CN | 108201174 A | 6/2018 |
| CN | 207561375 U | 7/2018 |
| CN | 209329677 U | 8/2019 |
| CN | 209860582 U | 12/2019 |
| CN | 210203356 U | 3/2020 |
| CN | 210780127 U | 6/2020 |
| DE | 20 2014 004 361 U1 | 10/2015 |
| EP | 3618168 A1 | 3/2020 |
| JP | 6-204934 A | 7/1994 |
| JP | 7-232542 A | 9/1995 |
| JP | 2011-188589 A | 9/2011 |
| JP | 2016-5805 A | 1/2016 |
| JP | 2016-214258 A | 12/2016 |
| JP | 2017-103305 A | 6/2017 |
| JP | 2017-116987 A | 6/2017 |
| JP | 2019-79707 A | 5/2019 |
| JP | 2019-511909 A | 5/2019 |
| JP | 2019-121268 A | 7/2019 |
| JP | 2019-521739 A | 8/2019 |
| JP | 2019-533887 A | 11/2019 |
| WO | 2017/144703 A1 | 8/2017 |
| WO | 2017/205692 A1 | 11/2017 |
| WO | 2019/150546 A1 | 8/2019 |

OTHER PUBLICATIONS

Decision to Grant dated Feb. 26, 2021, received for JP Application 2020-150103, 5 pages including English Translation.
Notice of Reasons for Refusal dated Dec. 4, 2020, received for JP Application 2020-150104, 14 pages including English Translation.
Decision to Grant dated Feb. 26, 2021, received for JP Application 2020-150104, 5 pages including English Translation.
Notice of Reasons for Refusal dated Dec. 4, 2020, received for JP Application 2020-150105, 10 pages including English Translation.
Decision of Refusal dated Feb. 26, 2021, received for JP Application 2020-150105, 7 pages including English Translation.
Decision to Grant dated Jun. 21, 2021, received for JP Application 2020-150105, 5 pages including English Translation.
Extended European Search Report dated Jan. 24, 2022, in corresponding European Patent Application No. 21193773.5.
Extended European search report dated Jan. 14, 2022, in corresponding European patent Application No. 21191904.8, 8 pages.
Extended European search report dated Feb. 4, 2022, in corresponding European patent Application No. 21194267.7, 8 pages.

* cited by examiner

POWER SUPPLY UNIT FOR AEROSOL GENERATION DEVICE

CROSS-REFERENCE TO RELATED APPLICATION(S)

This application claims priority to and the benefit of Japanese Patent Application No. 2020-150104 filed on Sep. 7, 2020, the entire disclosure of which is incorporated herein by reference. This application is also related to U.S. Ser. No. 17/464,724, entitled: "POWER SUPPLY UNIT FOR AEROSOL GENERATION DEVICE" and U.S. Ser. No. 17/464,702, entitled: "POWER SUPPLY UNIT FOR AEROSOL GENERATION DEVICE" filed on the same day as this application and hereby incorporated by reference.

BACKGROUND OF THE INVENTION

Field of the Invention

The present disclosure relates to a power supply unit for an aerosol generation device.

Description of the Related Art

An aerosol generation device such as an electronic cigarette includes an internal power supply such as a battery, and power is supplied from this internal power supply to a heater. Japanese Patent Laid-Open No. 2019-521739 proposes a technique of using an H bridge circuit to attach a cartridge to a vaporizer in a plurality of directions. The power supply unit of the aerosol generation device is connected to an external power supply to charge the internal power supply. If the number of directions which allow connection of the power supply unit to the external power supply is one, the convenience of a user becomes poor.

SUMMARY OF THE INVENTION

An aspect of the present disclosure proposes a technique capable of connecting a power supply unit of an aerosol generation device to an external power supply in a plurality of directions when charging an internal power supply.

According to an embodiment, a power supply unit for an aerosol generation device is provided. The power supply unit includes an internal power supply configured to hold power supplied to a heater configured to heat an aerosol source, a first connector connectable to an external power supply including a second connector including a first power supply terminal and a second power supply terminal, the first connector including a third power supply terminal and a fourth power supply terminal, and a polarity unification circuit. The polarity unification circuit includes a first diode, a second diode, a third diode, and a fourth diode, a first node connected to a cathode of the first diode and a cathode of the second diode, a second node connected to an anode of the third diode and an anode of the fourth diode, a third node connected to the third power supply terminal of the first connector, an anode of the first diode, and a cathode of the third diode, and a fourth node connected to the fourth power supply terminal of the first connector, an anode of the second diode, and a cathode of the fourth diode. In a case in which the first connector is connected to the second connector of the external power supply in a first direction, the third power supply terminal of the first connector is connected to the first power supply terminal of the second connector, and the fourth power supply terminal of the first connector is connected to the second power supply terminal of the second connector. In a case in which the first connector is connected to the second connector of the external power supply in a second direction different from the first direction, the fourth power supply terminal of the first connector is connected to the first power supply terminal of the second connector, and the third power supply terminal of the first connector is connected to the second power supply terminal of the second connector. A current flows from the first power supply terminal of the external power supply to a positive electrode of the internal power supply via the first node, and a current flows from a negative electrode of the internal power supply to the second power supply terminal of the external power supply via the second node. The power supply unit further includes a transistor including a parasitic diode arranged on a path between the first node of the polarity unification circuit and the positive electrode of the internal power supply, a reverse direction of the parasitic diode being a direction from the first node of the polarity unification circuit to the positive electrode of the internal power supply.

According to another embodiment, a power supply unit for an aerosol generation device is provided. The power supply unit includes an internal power supply configured to hold power supplied to a heater configured to heat an aerosol source, a first connector connectable to an external power supply including a second connector including a first power supply terminal and a second power supply terminal, the first connector including a third power supply terminal and a fourth power supply terminal, and a polarity unification circuit. The polarity unification circuit includes a first diode, a second diode, a third diode, and a fourth diode, a first node connected to a cathode of the first diode and a cathode of the second diode, a second node connected to an anode of the third diode and an anode of the fourth diode, a third node connected to the third power supply terminal of the first connector, an anode of the first diode, and a cathode of the third diode, and a fourth node connected to the fourth power supply terminal of the first connector, an anode of the second diode, and a cathode of the fourth diode. In a case in which the first connector is connected to the second connector of the external power supply in a first direction, the third power supply terminal of the first connector is connected to the first power supply terminal of the second connector, and the fourth power supply terminal of the first connector is connected to the second power supply terminal of the second connector. In a case in which the first connector is connected to the second connector of the external power supply in a second direction different from the first direction, the fourth power supply terminal of the first connector is connected to the first power supply terminal of the second connector, and the third power supply terminal of the first connector is connected to the second power supply terminal of the second connector. A current flows from the first power supply terminal of the external power supply to a positive electrode of the internal power supply via the first node, and a current flows from a negative electrode of the internal power supply to the second power supply terminal of the external power supply via the second node. The power supply unit further includes a first resistor arranged on a path between the second node of the polarity unification circuit and the negative electrode of the internal power supply, a second resistor arranged on a path between the second node of the polarity unification circuit and the negative electrode of the internal power supply, the second resistor being connected to the first resistor in series, a second protection integrated circuit configured to measure a voltage across the first resistor, and a controller configured to control power supply from the internal power supply to the heater. The second protection integrated circuit determines a value of a current flowing through the first resistor based on the voltage across the first resistor and stops supply of power from the external power supply to the internal power supply based on the value of the current flowing through the first resistor. The controller measures a voltage across the second resistor, determines a value of a current flowing through the second resistor based on the voltage across the second resistor, and stops power supply from the external power supply to the internal power supply based on the value of the current flowing through the second resistor.

According to still another embodiment, a power supply unit for an aerosol generation device is provided. The power supply unit includes an internal power supply configured to hold power supplied to a heater configured to heat an aerosol source, a first connector connectable to an external power supply including a second connector including a first power supply terminal and a second power supply terminal, the first connector including a third power supply terminal and a fourth power supply terminal, and a polarity unification circuit. The polarity unification circuit includes a first diode, a second diode, a third diode, and a fourth diode, a first node connected to a cathode of the first diode and a cathode of the second diode, a second node connected to an anode of the third diode and an anode of the fourth diode, a third node connected to the third power supply terminal of the first connector, an anode of the first diode, and a cathode of the third diode, and a fourth node connected to the fourth power supply terminal of the first connector, an anode of the second diode, and a cathode of the fourth diode. In a case in which the first connector is connected to the second connector of the external power supply in a first direction, the third power supply terminal of the first connector is connected to the first power supply terminal of the second connector, and the fourth power supply terminal of the first connector is connected to the second power supply terminal of the second connector. In a case in which the first connector is connected to the second connector of the external power supply in a second direction different from the first direction, the fourth power supply terminal of the first connector is connected to the first power supply terminal of the second connector, and the third power supply terminal of the first connector is connected to the second power supply terminal of the second connector. A current flows from the first power supply terminal of the external power supply to a positive electrode of the internal power supply via the first node, and a current flows from a negative electrode of the internal power supply to the second power supply terminal of the external power supply via the second node. The power supply unit further comprises, on a path between the first node of the polarity unification circuit and the positive electrode of the internal power supply a first protection integrated circuit configured to stop supply of power to the internal power supply, a diode whose forward direction is a direction from the first node of the polarity unification circuit to the positive electrode of the internal power supply, and a transistor including a parasitic diode whose reverse direction is a direction from the first node of the polarity unification circuit to the positive electrode of the internal power supply. In the named order from the first node of the polarity unification circuit to the positive electrode of the internal power supply.

Further features of the present disclosure will become apparent from the following description of exemplary embodiments with reference to the attached drawings.

DESCRIPTION OF THE EMBODIMENTS

Figure 1:
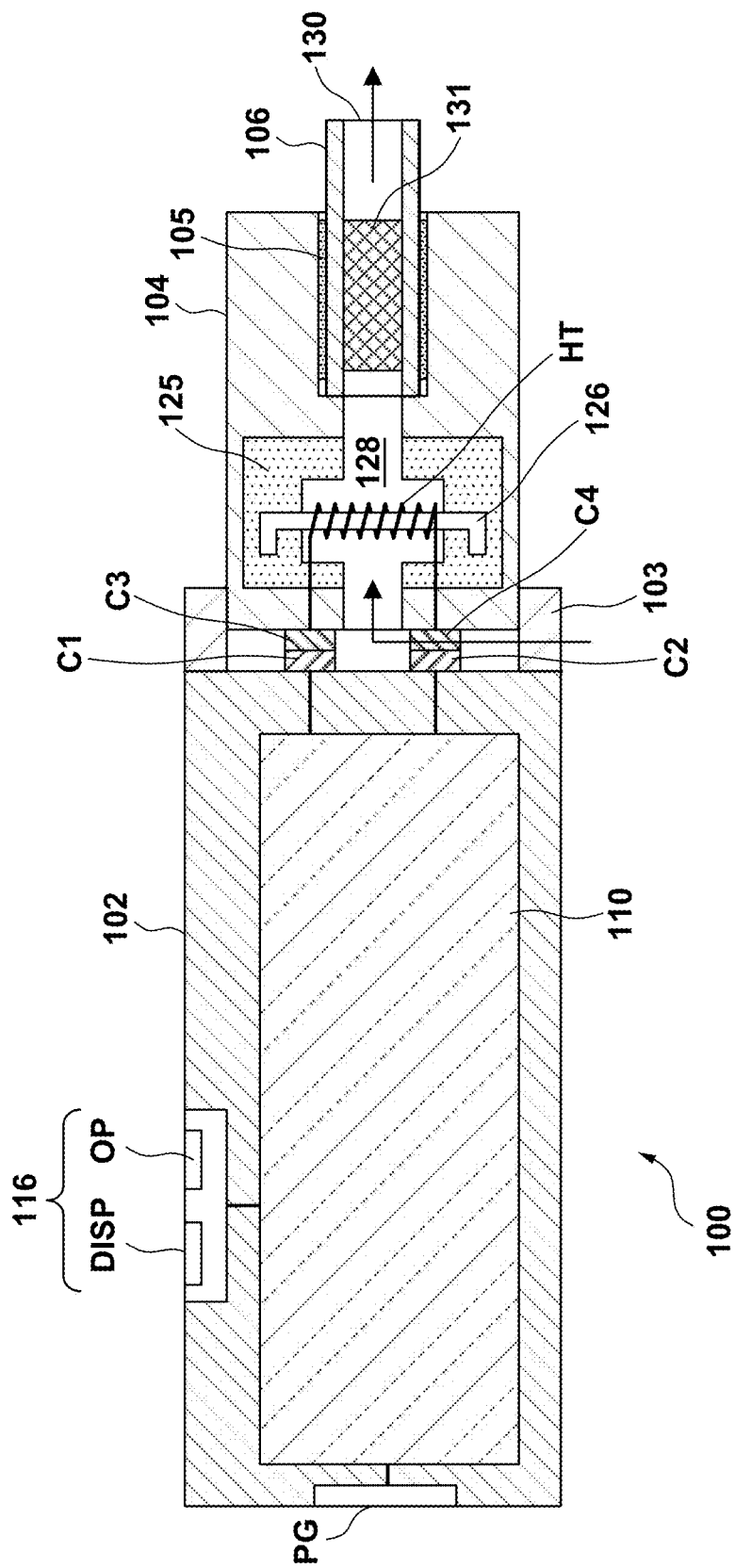
FIG. 1 is a view for explaining an example of the arrangement of an aerosol generation device according to an embodiment of the present disclosure.

Hereinafter, embodiments will be described in detail with reference to the accompanying drawings. It should be noted that the following embodiments are not intended to limit the scope of the appended claims, and that not all the combinations of features described in the embodiments are necessarily essential to the present invention. Of a plurality of features described in the embodiments, two or more features may arbitrarily be combined. In addition, the same reference numerals denote the same or similar parts, and a repetitive description will be omitted.

FIG. 1 schematically shows the arrangement of an aerosol generation device 100 according to an embodiment. The aerosol generation device 100 can be configured to provide, to a user via an inhalation port 130, a gas containing an aerosol, a gas containing an aerosol and a flavor material, an aerosol, or an aerosol containing a flavor material in accordance with an operation requesting the aerosol (to be also referred to as an aerosol requesting operation hereinafter) such as an inhalation operation by the user. The aerosol generation device 100 can comprise a power supply unit 102 and an atomizer 104. The aerosol generation device 100 can comprise a holding portion 103 that detachably holds the atomizer 104. The power supply unit 102 may be understood as an inhalation unit controller. The atomizer 104 can be configured to atomize an aerosol source. The aerosol source, can be, for example, a liquid such as a multivalent alcohol such as glycerin or propylene glycol. Alternatively, the aerosol source may contain a drug. The aerosol source can be a liquid, a solid, or a mixture of a liquid and a solid. A vapor source such as water may be used in place of the aerosol source.

The aerosol generation device 100 may further comprise a capsule 106 containing a flavor source 131. The atomizer 104 can include a capsule holder 105 that detachably holds the capsule 106. The flavor source 131 can be a molded body obtained by molding, for example, a cigarette material. Alternatively, the flavor source 131 may be made of a plant (for example, mint, herb, Chinese medicine, coffee beans, or the like) except the cigarette. A fragrance such as menthol may be added to the flavor source. The flavor source 131 may be added to an aerosol source. Note that the capsule holder 105 may be arranged in the power supply unit 102 in place of the atomizer 104. The atomizer 104 and the capsule holder 105 may be integrally formed in place of an arrangement in which the aerosol generation device 100 or the atomizer 104 includes the capsule holder 105.

The power supply unit 102 can include electrical components 110. The electrical components 110 can include a user interface 116. Alternatively, the power supply unit 102 may be understood to include the electrical components 110 and the user interface 116. The user interface 116 can include a display unit DISP (for example, a light emitting element such as an LED (Light Emitting Diode) and/or an image display unit such as an LCD) and/or an operation unit OP (for example, a switch such as a button switch and/or a touch display).

The holding portion 103 of the power supply unit 102 can include an electrical contact C1 and an electrical contact C2. In a state in which the atomizer 104 is held by the holding portion 103, the electrical contact C1 of the holding portion 103 can contact an electrical contact C3 of the atomizer 104, and the electrical contact C2 of the holding portion 103 can contact an electrical contact C4 of the atomizer 104. The power supply unit 102 can supply power to the atomizer 104 via the electrical contact C1 and the electrical contact C2.

The atomizer 104 can include the electrical contact C3 and the electrical contact C4 described above. In addition, the atomizer 104 can include a heater HT for heating the aerosol source, a container 125 for holding the liquid aerosol source, and a transport portion 126 for transporting the aerosol source held by the container 125 to a heating region of the heater HT and holding the aerosol source in the heating region. The transport portion 126 is called a wick. At least part of the heating region of the heater HT can be arranged in a channel 128 formed in the atomizer 104. The electrical contact C1, the electrical contact C3, the heater HT, the electrical contact C4, and the electrical contact C2 form a current path for flowing the current to the heater HT. The transport portion 126 can be made of a fiber element such as a glass fiber, a porous material such as a ceramic, or a combination thereof. Note that the unit for transporting the aerosol source held in the container 125 to the heating region is not limited to the wick, but a spraying device such as a spray or a transporting unit such as a pump may be used instead.

As described above, the atomizer 104 can include the capsule holder 105 for detachably holding the capsule 106. As an example, the capsule holder 105 can hold the capsule 106 such that part of the capsule 106 is accommodated in the capsule holder 105 or the atomizer 104 and the remaining part of the capsule 106 is exposed. The user can hold the inhalation port 130 with his/her mouth and suck the gas containing the aerosol. Since the detachable capsule 106 includes the inhalation port 130, the aerosol generation device 100 can be kept clean.

When the user holds the inhalation port 130 with his/her mouth and performs the inhalation operation, as exemplified by an arrow, air flows into the channel 128 of the atomizer 104. When the heater HT heats the aerosol source, the vaporized and/or aerosolized aerosol source is transported toward the inhalation port 130 with the air. In the process in which the aerosol source is transported toward the inhalation port 130, the vaporized and/or aerosolized aerosol source is cooled to form fine liquid droplets, thereby promoting aerosolization. In the arrangement in which the flavor source 131 is arranged, the flavor material generated by the flavor source 131 is added to this aerosol, and the resultant material is transported to the inhalation port 130, thus allowing the user to suck the aerosol containing the flavor material. Since the flavor material generated by the flavor source 131 is added to the aerosol, the flavor material can be efficiently transported to the lungs of the user without staying in the oral cavity.

The power supply unit 102 further includes a connector PG connected to an external device (not shown in FIG. 1). The external device connected to the power supply unit 102 can be, for example, a charger of the power supply unit 102. In this case, the external device functions as an external power supply for supplying power to the power supply unit 102. The external device may communicate with the power supply unit 102 via the connector PG.

In the example shown in FIG. 1, the atomizer 104 detachable from the power supply unit 102 includes the heater HT. The heater HT may be attached to the power supply unit 102 in place of the atomizer 104. In this case, an aerosol generation product including an aerosol base that holds the aerosol source and a filter may be exchangeably attached to the power supply unit 102. The aerosol generation product is inserted into the heater HT of the power supply unit 102, and accordingly the heater HT can heat the aerosol source in the aerosol base. The used aerosol generation product can be detachable from the power supply unit 102 in a state in which the heater HT is coupled to the power supply unit 102.

Figure 2:
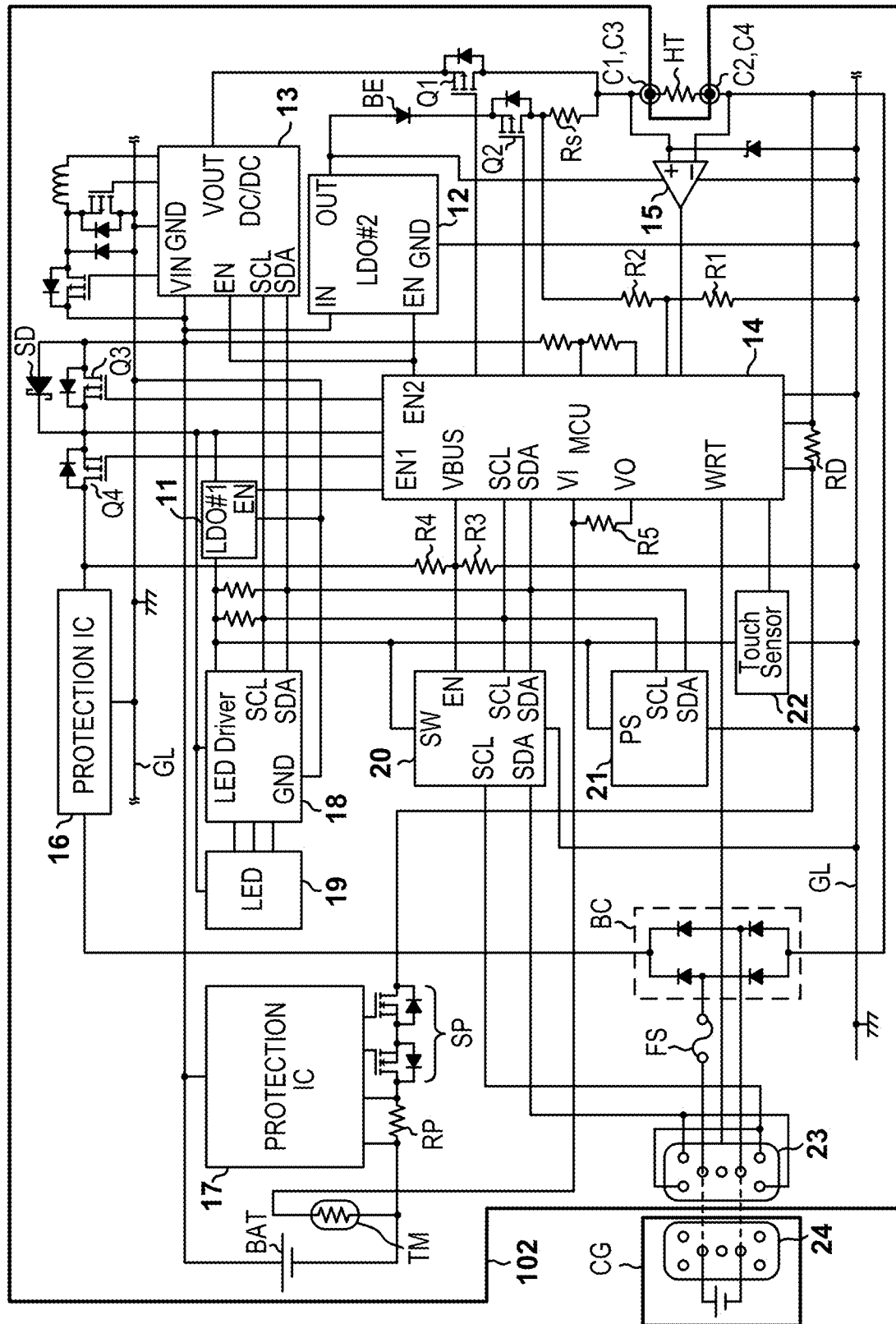
FIG. 2 is a diagram for explaining an example of the circuit arrangement of a power supply unit according to the embodiment of the present disclosure.

FIG. 2 shows an example of the overall circuit arrangement of the power supply unit 102. In some embodiments, the power supply unit 102 includes a plurality of circuit components shown in FIG. 2. The outline of the arrangement of each circuit component will be described with reference to FIG. 2, and then details of some circuit components will be described later with reference to other drawings.

A controller 14 controls the overall operation of the power supply unit 102. The controller 14 can be a microcontroller unit formed by, for example, an integrated circuit (IC). More specifically, the controller 14 supplies a control signal to each circuit component in the power supply unit 102 to control the operation of each circuit component. In addition, the controller 14 controls power supply from an internal power supply BAT to the heater HT.

The internal power supply BAT is a power supply for holding power supplied to the heater HT in order to heat the aerosol source. The internal power supply BAT can be formed by a primary battery such as a dry cell, a secondary battery such as a lithium ion battery, or a capacitor such as an electric double layer capacitor. In the following description, a case in which the internal power supply BAT is formed by the secondary battery will be described, unless otherwise specified.

A connector 23 is a connector connectable to an external device CG. The external device CG includes a connector 24. When the connector 23 of the power supply unit 102 is physically connected (coupled) to the connector 24 of the external device CG, the power supply unit 102 and the external device CG are electrically connected to each other. The connector 23 and the connector 24 can be connectable in a plurality of different directions.

The external device CG can supply power to the internal power supply BAT via the connectors 23 and 24. In addition, the external device CG can communicate with each circuit component in the power supply unit 102. In the example shown in FIG. 2, the external device CG and the power supply unit 102 perform I2C (Inter-Integrated Circuit) communication as a type of serial communication method. Each circuit component which performs communication in the power supply unit 102 includes a communication terminal ("SCL" in FIG. 2) for transmitting/receiving a clock signal and a communication terminal ("SDA" in FIG. 2) for transmitting/receiving a data signal. The clock signal communication terminals of the respective circuit components are connected to each other, and the data signal communication terminals of the respective circuit components are connected to each other. In the example shown in FIG. 2, I2C communication is performed. However, another serial communication method such as UART (Universal Asynchronous Receiver/Transmitter) or SPI (Serial Peripheral Interface) may be used in place of the I2C communication. The external device CG can transmit data to the write terminal ("WRT" in FIG. 2) of the controller 14.

If the internal power supply BAT is formed by the primary battery, the external device CG need not have a charging function, but can have only a communication function. Alternatively, the external device CG need not have the communication function, but may have only the charging function, or may have both the communication function and the charging function. If the external device CG has the charging function, the external device CG can be referred to as the external power supply. In the following description, a case in which the external device CG has both the charging function and the communication function will be described, unless otherwise specified.

A polarity unification circuit BC is a circuit component for unifying the polarity of the connector 23. The polarity unification circuit BC is connected to the two power supply terminals of the connector 23. Of the potentials supplied to the two power supply terminals of the connector 23, the polarity unification circuit BC connects a higher potential (for example, a power supply potential VBUS of the external device CG) to the positive electrode (via another electrical component) of the internal power supply BAT and a lower potential (for example, the ground potential of the external device CG) to the negative electrode (via another electrical component) of the internal power supply BAT. A fuse FS is arranged between the polarity unification circuit BC and the connector 23. If a current flowing between the polarity unification circuit BC and the connector 23 exceeds a threshold, the fuse FS is disconnected. Accordingly, power supply from the external device CG to the power supply unit 102 is stopped.

A protection IC 16 is a circuit component for protecting the circuit components in the power supply unit 102 from an excessive current. The protection IC 16 is positioned on the power supply path for supplying power from the external device CG to the internal power supply BAT. If a current flowing through the protection IC 16 exceeds the threshold for a predetermined period, the protection IC 16 sets, to the disconnected state, the power supply path through which the current flows through the protection IC 16. Accordingly, the power supply from the external device CG to the power supply unit 102 is stopped to protect a subsequent circuit (for example, a transistor Q3). The protection IC 16 is connected to a ground line GL of the power supply unit 102. The ground line GL is connected to ground of a circuit board on which each circuit component (for example, the controller 14) of the power supply unit 102 is mounted. As a detailed example, ground of the circuit board is made of a metal plate.

A transistor Q4 is a circuit component for preventing the flow of a current to the connector 23 during the power supply from the internal power supply BAT to the heater HT. The transistor Q4 can be an FET (Field Effect Transistor) or an IGBT (Insulated Gate type Bipolar Transistor). The transistor Q4 may be an n-channel MOS transistor. This also applies to other transistors to be described later. The transistor Q4 is positioned on the power supply path for supplying power from the external device CG to the internal power supply BAT. The transistor Q4 is arranged such that the direction from the external device CG to the internal power supply BAT is the forward direction of a parasitic diode of the transistor Q4. The gate of the transistor Q4 is connected to the controller 14.

The transistor Q3 is a circuit component for adjusting the amount of power supplied from the external device CG to the internal power supply BAT. The protection IC 16 is positioned on the power supply path for supplying power from the external device CG to the internal power supply BAT. The transistor Q3 is positioned such that the direction from the external device CG to the internal power supply BAT is the reverse direction of the parasitic diode of the transistor Q3. The gate of the transistor Q3 is connected to the controller 14. A Schottky diode SD is connected parallel to the transistor Q3. More specifically, the cathode of the Schottky diode SD is connected to the source of the transistor Q3, and the anode of the Schottky diode SD is connected to the drain of the transistor Q3.

A protection IC 17 is a circuit component for protecting the internal power supply BAT from the excessive current. More specifically, the protection IC 17 measures a voltage across a resistor RP connected to the negative electrode of the internal power supply BAT and determines a current flowing through the resistor RP. If this current exceeds a threshold, the protection IC 17 operates a transistor pair SP to stop the current flowing out from the negative electrode of the internal power supply BAT or the current flowing in the negative electrode.

A voltage converter 13 is a circuit component for converting the power supply voltage supplied from the internal power supply BAT into a heater driving voltage. The power supply voltage from the internal power supply BAT is supplied to the input terminal ("VIN" in FIG. 2) of the voltage converter 13, and the heater driving voltage is output from the output terminal ("VOUT" in FIG. 2) of the voltage converter 13. An enable signal is supplied from the enable terminal ("EN" in FIG. 2) of the voltage converter 13 to the control terminal ("EN2" in FIG. 2) of the controller 14. The ground terminal ("GND" in FIG. 2) of the voltage converter 13 is connected to the ground line GL. The voltage converter 13 can communicate with the controller 14 by the I2C communication. The voltage converter 13 may be formed by a DC/DC converter. The voltage converter 13 may be formed by a buck-boost DC/DC converter.

The output terminal of the voltage converter 13 is connected to the heater HT via a transistor Q1. The gate of the transistor Q1 is connected to the controller 14. The controller 14 switches the level of the control signal supplied to the gate of the transistor Q1 to switch ON/OFF state of the transistor Q1. During the ON period of the transistor Q1, the heater driving voltage is applied to the heater HT to heat the heater HT.

A regulator 12 is a circuit component for converting the power supply voltage supplied from the internal power supply BAT into a power supply voltage of an operational amplifier 15. The power supply voltage of the operational amplifier 15 is used also to measure the resistance value of the heater HT. The regulator 12 can be a linear regulator, and more specifically a low dropout (LDO) regulator. The power supply voltage is supplied from the internal power supply BAT to the input terminal ("IN" in FIG. 2) of the regulator 12. The power supply voltage of the operational amplifier 15 is output from the output terminal ("OUT" in FIG. 2) of the regulator 12. An enable signal is supplied from the control terminal ("EN2" in FIG. 2) of the controller 14 to the enable terminal ("EN" in FIG. 2) of the regulator 12. The ground terminal ("GND" in FIG. 2) of the regulator 12 is connected to the ground line GL. In this embodiment, the enable terminal of the voltage converter 13 and the enable terminal of the regulator 12 are connected to the common control terminal ("EN2" in FIG. 2) of the controller 14. Alternatively, the controller 14 may have individual control terminals respectively connected to the enable terminal of the voltage converter 13 and the enable terminal of the regulator 12. The voltage output from the output terminal of the regulator 12 may be kept constant.

The output terminal of the regulator 12 is connected to the heater HT via a diode BE, a transistor Q2, and a resistor Rs. The diode BE prevents the reverse flow of the current from the transistor Q2 to the regulator 12. The gate of the transistor Q2 is connected to the controller 14. The controller 14 switches the level of the control signal supplied to the gate of the transistor Q2 to switch the ON/OFF state of the transistor Q2. During the ON period of the transistor Q2, the output voltage of the regulator 12 is applied to the heater HT. The node between the transistor Q2 and the resistor Rs is connected to the ground line GL via the resistor R2 and the resistor R1. The controller 14 is connected to the node between the resistor R2 and the resistor R1.

The noninverting input terminal of the operational amplifier 15 is connected to one terminal of the heater HT. The inverting input terminal of the operational amplifier 15 is connected to the other terminal of the heater HT. The output terminal of the operational amplifier 15 is connected to the controller 14. The operational amplifier 15 supplies the voltage applied to the heater HT to the controller 14. If the heater HT has a positive or negative temperature coefficient characteristic by which the resistance value changes depending on the temperature of the heater HT, the voltage applied to the heater HT has a strong correlation with the temperature of the heater HT. The controller 14 estimates the temperature of the heater HT based on this voltage, adjusts the amount of power supplied to the heater HT based on this estimated temperature, and controls the temperature of the heater HT based on the adjusted amount of power. In this embodiment, a voltage obtained by dividing a predetermined voltage output from the regulator 12 by the resistor Rs and the heater HT is input to the noninverting input terminal of the operational amplifier 15. Since this divided voltage has a strong correlation with the temperature of the heater HT, the controller 14 can accurately estimate the temperature of the heater HT from the voltage (the signal) output from the output terminal of the operational amplifier 15.

A regulator 11 is a circuit component for converting the voltage supplied from the external device CG or the internal power supply BAT into power supply voltages of a switch unit 20, a puff sensor 21, and a touch sensor 22. The voltage output from the regulator 11 is also used as the power supply voltage of the I2C communication. The regulator 11 can be a linear regulator. The power supply voltage is supplied from the external device CG or the internal power supply BAT to the input terminal of the regulator 11, and the power supply voltage of each circuit component is output from the output terminal of the regulator 11. In this embodiment, the power supply voltages of an LED driver 18 and an LED 19 are not supplied from the output terminal of the regulator 11, as will be described later. Alternatively, the power supply voltages of the LED driver 18 and the LED 19 may be supplied from the output terminal of the regulator 11. An enable signal is supplied from the control terminal ("EN1" in FIG. 2) of the controller 14 to the enable terminal of the regulator 11. The ground terminal of the regulator 11 is connected to the ground line GL. The regulator 11 can be used in both a case in which the power is supplied from the external device CG and a case in which the internal power supply BAT is discharged. On the other hand, during the supply of power from the external device CG, the regulator 12 is not used. During the discharge of the internal power supply BAT (more specifically, during the inhalation operation of the user), the regulator 12 is used. For this reason, the regulator 11 can be a power-saving component as compared with the regulator 12. The regulator 12 generates the operation voltage of the operational amplifier 15. The operation voltage of the operational amplifier 15 influences the accuracy and speed of temperature estimation of the heater HT by the controller 14. For this reason, the regulator 12 can be a component having responsiveness higher than that of the regulator 11.

The LED driver 18 is a circuit component for controlling the operation of the LED 19. The LED 19 is equivalent to a display unit DISP in FIG. 1. The power supply voltage is supplied from the external device CG or the internal power supply BAT to the power supply terminal of the LED driver 18. The ground terminal of the LED driver 18 is connected to the ground line GL. The LED driver 18 can communicate with the controller 14 by the I2C communication. The LED driver 18 changes the ON state of the LED 19 to notify the user of the state of the aerosol generation device 100. More specifically, the LED driver 18 changes the state of the LED 19 as the ON state, the OFF state, or the flickering state. If the LED 19 includes a plurality of LEDs, the number of ON LEDs can be increased/decreased.

The switch unit 20 is a circuit component for changing the state of the communication path of the I2C communication between the connector 23 and the controller 14 to the disconnected state or the conductive state. The power supply voltage is supplied from the regulator 11 to the power supply terminal of the switch unit 20. The ground terminal of the switch unit 20 is connected to the ground line GL. The enable terminal ("EN" in FIG. 2) of the switch unit 20 is connected to the node between a resistor R4 and a resistor R3. The resistor R4 and the resistor R3 are connected in series with each other between the line for receiving the power supply voltage from the external device CG and the ground line GL. For this reason, the node between the resistor R4 and the resistor R3 is set at high level while the power supply voltage is supplied from the external device CG. This node is also connected to the detection terminal ("VBUS" in FIG. 2) of the controller 14. When the potential of the detection terminal is measured, the controller 14 can detect that the fact that the power supply voltage is supplied from the external device CG. If the voltage applied to the enable terminal is set at high level, the switch unit 20 sets the communication path of the I2C communication between the connector 23 and the controller 14 to the conductive state. On the other hand, if the voltage applied to the enable terminal is set at low level, the switch unit 20 sets the communication path of the I2C communication between the connector 23 and the controller 14 to the disconnected state. Accordingly, even if static electricity is applied to the communication terminal of the connector 23 or the communication terminal is short-circuited, an unexpected current will not flow to the circuit component in the power supply unit 102. Therefore, the safety of the power supply unit 102 can be improved.

The puff sensor 21 is a circuit component for detecting the inhalation operation of the user. As a detailed example, the puff sensor 21 is formed by a microphone condenser, a flow rate sensor, or one or more pressure sensors. The power supply voltage is supplied from the regulator 11 to the power supply terminal of the puff sensor 21. The ground terminal of the puff sensor 21 is connected to the ground line GL. The puff sensor 21 can communicate with the controller 14 by the I2C communication.

The touch sensor 22 is a circuit component for detecting the touch operation by the user. The power supply voltage is supplied from the regulator 11 to the power supply terminal of the touch sensor 22. The ground terminal of the touch sensor 22 is connected to the ground line GL. The touch sensor 22 notifies the controller 14 of the detection result of the touch operation.

A temperature sensor TM is a circuit component for measuring the temperature near the internal power supply BAT. The temperature sensor TM can be formed by a thermistor, a thermocouple, a temperature measurement resistor band, or an IC temperature sensor. For example, the controller 14 applies a voltage from the output terminal ("VO" in FIG. 2) to the temperature sensor TM. This voltage is divided by the resistor R5 and the temperature sensor TM and input to the input terminal ("VI" in FIG. 2) of the controller 14. The controller 14 measures the potential at the input terminal to determine the resistance value of the temperature sensor TM, and determines the temperature of the temperature sensor TM based on this resistance value. If the temperature sensor TM is arranged on or near the surface of the internal power supply BAT, the temperature of the temperature sensor TM can be used as the temperature of the internal power supply BAT.

The controller 14 measures a voltage across a resistor RD connected to the negative electrode of the internal power supply BAT to determine a current flowing through the resistor RD. If this current exceeds a threshold, the controller 14 operates the transistor Q3 or the voltage converter 13 to stop a current flowing out from the negative electrode of the internal power supply BAT or a current flowing into the negative electrode. Note that by the internal processing of the controller 14, the current flowing out from the negative electrode of the internal power supply BAT and the current flowing into the negative electrode of the internal power supply BAT have positive values. If the current exceeds the threshold and the current flowing out from the negative electrode of the internal power supply BAT or flowing into the negative electrode is stopped, the controller 14 can improve the safety of the aerosol generation device 100.

In addition, the controller 14 may stop the current flowing into the negative electrode of the internal power supply BAT by operating the transistor Q1 or stop the current flowing into the negative electrode of the internal power supply BAT by operating the voltage converter 13 and the transistor Q1.

Figure 3:
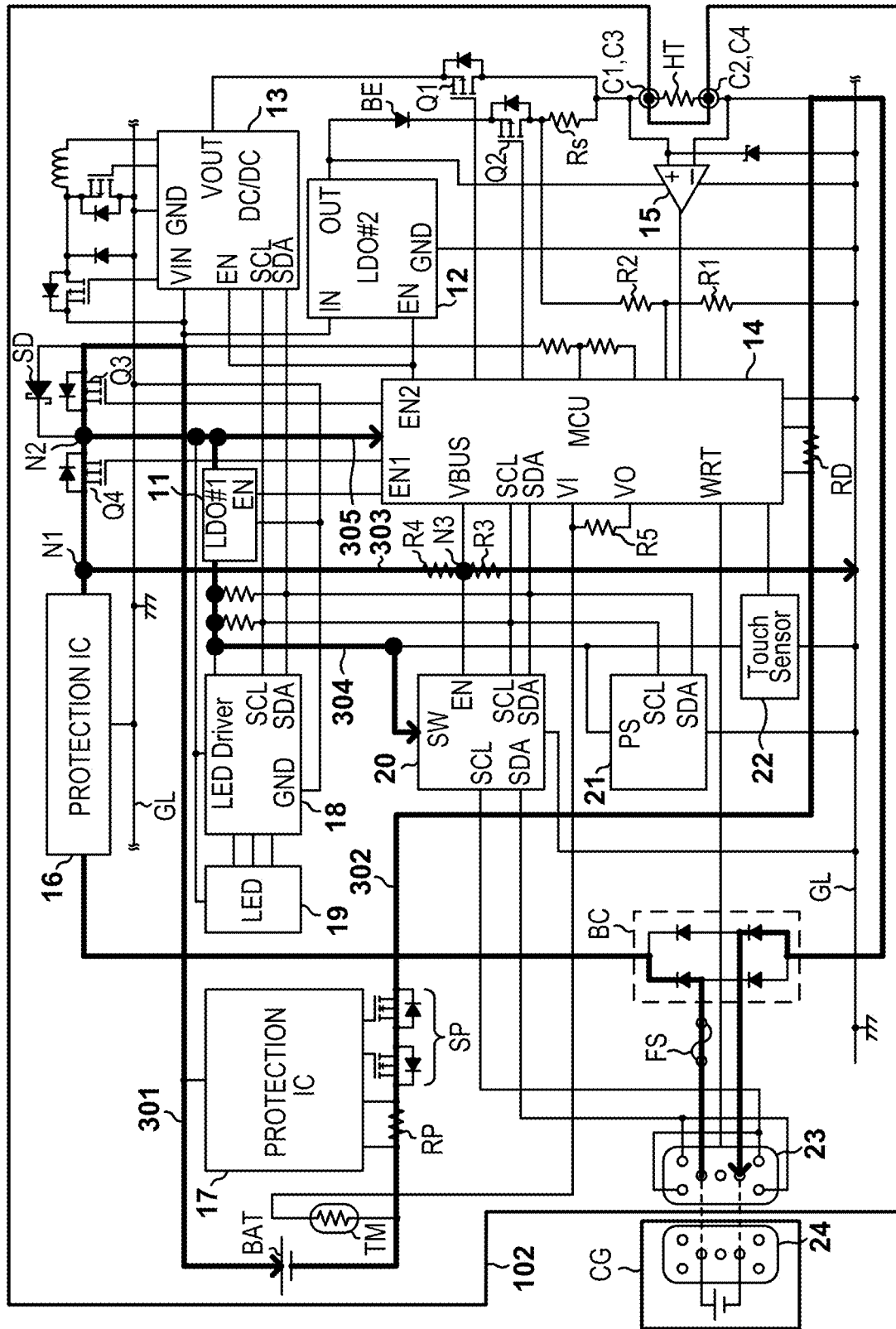
FIG. 3 is a diagram for explaining a current when the internal power supply of the embodiment of the present disclosure is charged.

The flow of the current during supply of the power supply voltage from the external device CG to the power supply unit 102 will be described below with reference to FIG. 3. When the connector 24 of the external device CG is connected to the connector 23 of the power supply unit 102, the external device CG supplies the power supply potential VBUS to one of the two power supply terminals of the connector 23 of the power supply unit 102 and supplies the ground potential to the other power supply terminal. The ground potential is obtained from ground (not shown) provided in the external device CG. The current flowing from the power supply terminal on the high potential side of the connector 23 sets the potential of a node N1 to high level via the polarity unification circuit BC and the protection IC 16. The node N1 is a node to which the protection IC 16, the drain of the transistor Q4, and the resistor R4 are connected. When the node N1 is set at high level, a current flows through the parasitic diode of the transistor Q4 in the forward direction, so that a node N2 is also set at high level. The node N2 is a node to which the source of the transistor Q4, the source of the transistor Q3, and the cathode of the Schottky diode SD are connected. At this stage, since the transistor Q3 is kept off, the current does not flow over the transistor Q3. In other words, at this stage, the internal power supply BAT is not charged.

In response to the high level of the potential at the node N1, a current flows from the node N1 to the ground line GL via the resistor R4 and the resistor R3, so that a node N3 is also set at high level. The node N3 is a node to which the resistor R4, the resistor R3, the enable terminal of the switch unit 20, and the detection terminal of the controller 14 are connected. When the node N3 is set at high level, a high-level signal (the voltage signal) is simultaneously supplied to the enable terminal of the switch unit 20 and the detection terminal of the controller 14. That is, the enable terminal of the switch unit 20 is automatically set at high level when the power supply potential is supplied from the external device CG to the power supply terminal of the connector 23.

The node N2 is connected to the power supply terminal of the controller 14, the input terminal of the regulator 11, and the power supply terminal of the LED driver 18, and also to the power supply terminal of the LED 19. When the node N2 I set at high level, the operation voltages are supplied to the controller 14, the LED driver 18, and the LED 19, thereby activating these circuit components. The activated controller 14 supplies a high-level signal to the enable terminal of the regulator 11. Accordingly, the regulator 11 supplies the operation voltages to the power supply terminal of the switch unit 20, the power supply terminal of the puff sensor 21, and the power supply terminal of the touch sensor 22.

Upon reception of the operation voltage by the switch unit 20, since the level at the enable terminal is high level, the switch unit 20 sets the communication path between the connector 23 and the controller 14 to a conductive state. This makes it possible to cause the controller 14 to communicate with the external device CG. Since the communication path between the connector 23 and the controller 14 is set at the conductive state if needed, generation of an abnormality through this communication path can be suppressed. In addition, the controller 14 can also communicate with the LED driver 18 and the puff sensor 21.

When the controller 14 sets the transistor Q3 to the ON state, a current flows from the node N3 to the positive electrode of the internal power supply BAT. This current charges the internal power supply BAT. More specifically, power is supplied from the external device CG to the internal power supply BAT via a power supply path 301 passing in the order of the fuse FS, the polarity unification circuit BC, the protection IC 16, the transistor Q4, and the transistor Q3 from the connector 23 to the internal power supply BAT. The current flowing out from the negative electrode of the internal power supply BAT flows from the power supply terminal of the connector 23 on the low potential side to ground of the external device CG via a power supply path 302. The power supply path 302 passes from the negative electrode of the internal power supply BAT to the connector 23 in the order of the resistor RP, the transistor pair SP, the resistor RD, and the polarity unification circuit BC.

In the power supply path 301, the current from the connector 23 is supplied to the source of the transistor Q3, and the current from the drain of the transistor Q3 is supplied to the positive electrode of the internal power supply BAT. Accordingly, the controller 14 can control the voltage of the gate of the transistor Q3 to supply power from the external device CG to the internal power supply BAT. In this manner, since the transistor Q3 is used to control charging of the internal power supply BAT by a dropper method (this will also be referred to as a series method or regulator method), the transistor Q3 is also called a charging transistor. The transistor Q3 controlled by the dropper method discards an unnecessary component of the power supplied from the connector 23 as heat, thereby generating the voltage and current used for charging of the internal power supply BAT. The controller 14 may be configured to acquire the current and voltage supplied to the transistor Q3. The controller 14 may feed back, to the control of the dropper method, a difference between the acquired current and voltage and the voltage and current to be used for charging of the internal power supply BAT, thereby improving the accuracy of the charging of the internal power supply BAT. By controlling the charging of the transistor Q3, a charging integrated circuit is unnecessary, thereby reducing the circuit scale.

The controller 14 can acquire the state of the internal power supply BAT. The state of the internal power supply BAT includes at least one of the temperature of the internal power supply BAT and the state of health (SOH) of the internal power supply BAT. The temperature of the internal power supply BAT and the state of health of the internal power supply BAT may be determined based on the temperature of the temperature sensor TM or a time required for charging. Alternatively, the temperature of the internal power supply BAT and the state of health of the internal power supply BAT may be acquired by a dedicated IC and acquired by the controller 14 by the I2C communication from the dedicated IC. The controller 14 can change at least one of the drain current and the drain voltage of the transistor Q3 based on the state of the internal power supply BAT and adjust the power supplied from the external device CG to the internal power supply BAT. This makes it possible for the controller 14 to control the charging of the internal power supply BAT with a larger degree of freedom.

The parasitic diode of the transistor Q4 is arranged on a path between the polarity unification circuit BC and the positive electrode of the internal power supply BAT. The forward direction of the parasitic diode of the transistor Q4 is a direction from the polarity unification circuit BC to the positive electrode of the internal power supply BAT. For this reason, the potential (that is, the power supply potential VBUS) of the node N1 is reduced by the forward voltage of (the parasitic diode of) the transistor Q4, and the reduced potential is supplied to the transistor Q3. As described above, the transistor Q3 controlled by the dropper method discards an unnecessary component of the power supplied from the connector 23 as heat, thereby generating the voltage and current used for charging of the internal power supply BAT. If power appropriately reduced by (the parasitic diode of) the transistor Q4 can be supplied to the transistor Q3, heat generated when the transistor Q3 generates the voltage for charging the internal power supply BAT can be reduced. In addition, the heat generated at the time of charging in the power supply unit 102 can be dispersed to the transistor Q3 and the transistor Q4. This makes it possible to improve durability of the transistor Q3 and the power supply unit 102. A diode may be used in place of the transistor Q4. The forward voltage of the parasitic diode of the transistor Q4 is higher than the forward voltage of the diode, the potential supplied to the transistor Q3 can be efficiently reduced by using the parasitic diode of the transistor Q4.

The negative electrode of the internal power supply BAT is not connected to the ground line GL (that is, ground of the power supply unit 102). For this reason, the current from the negative electrode of the internal power supply BAT flows to ground of the external device CG via the connector 23. The resistor RP and the resistor RD are connected in series with each other on the power supply path 302. The current flowing out from the negative electrode of the internal power supply BAT at the time of charging of the internal power supply BAT passes through the resistor RP and the resistor RD. The protection IC 17 measures a voltage across the resistor RP and determines the value of the current flowing through the resistor RP based on the measured voltage. As in the controller 14, the current flowing out from the negative electrode of the internal power supply BAT and the current flowing into the negative electrode of the internal power supply BAT indicate positive values by processing in the protection IC 17. Based on this current value, the protection IC 17 stops supplying power from the external device CG to the internal power supply BAT. For example, when this current exceeds the threshold, the protection IC 17 turns off one or both transistors of the transistor pair SP, the current flowing through the power supply path 302 may be cut off.

The controller 14 measures a voltage across the resistor RD and determines the value of the current flowing through the resistor RD based on the measured voltage. As described above, by the processing in the controller 14, the current flowing out from the negative electrode of the internal power supply BAT and the current flowing into the negative electrode of the internal power supply BAT indicate the positive values. The controller 14 stops supply of the power from the external device CG to the internal power supply BAT based on this current value. For example, when this current value exceeds the threshold, the controller 14 may turn off the transistor Q3, thereby cutting off the current flowing through the power supply path 301. In this manner, when the current flowing through the power supply path 302 is monitored by both of the protection IC and the controller 14, the safety of the power supply unit 102 is further improved. Instead, only one of the resistor RP and the resistor RD may be arranged on the power supply path 302.

When the charging of the internal power supply BAT is complete, the controller 14 instructs to stop the supply of the power supply potential to the external device CG by the I2C communication. At the time of excessive discharging of the internal power supply BAT, the controller 14 keeps the transistor Q3 off even if the power supply potential is supplied from the external device CG. Note that as a detailed example, the time of excessive discharging of the internal power supply BAT indicates the time when the voltage of the internal power supply BAT is lower than the discharge end voltage and the voltage for operating the controller 14 cannot be supplied to the power supply terminal of the controller 14. In other words, at the time of excessive discharging, the controller 14 cannot be operated by only the power supplied from the internal power supply BAT. Even if the transistor Q3 is kept off, the operation power is supplied from the external device CG to the controller 14 via a power supply path 305. The power supply path 305 is a path passing from the connector 23 in the order of the fuse FS, the polarity unification circuit BC, the protection IC 16, and the transistor Q4. The power supply path 305 does not pass the transistor Q3. In addition, even if the transistor Q3 is kept off, the operation power is supplied from the external device CG to the power supply terminal of the switch unit 20 via a power supply path 304. More specifically, since the controller 14 cannot be operated at the time of excessive discharging of the internal power supply BAT, the enable signal is not supplied from the control terminal ("EN1" in FIG. 2) of the controller 14 to the enable terminal ("EN" in FIG. 2) of the regulator 11. Accordingly, since the regulator 11 stops the operation, the operation voltage is not supplied to the power supply terminal of the switch unit 20. However, if the operation power is supplied from the external device CG to the controller 14 via the power supply path 305, the controller 14 can supply the enable signal from the control terminal to the enable terminal of the regulator 11. In addition, the operation power is also supplied from the external device CG to the input terminal of the regulator 11 via the power supply path 304. Accordingly, the operation power is supplied from the regulator 11 to the power supply terminal of the switch unit 20. The power supply path 304 is a path passing from the connector 23 in the order of the fuse FS, the polarity unification circuit BC, the protection IC 16, the transistor Q4, and the regulator 11 and does not pass through the transistor Q3. In addition, the high-level signal is supplied to the enable terminal of the switch unit 20. Accordingly, even if the transistor Q3 is kept off, the controller 14 can communicate with the external device CG, and for example, an error state can be transmitted. In addition, even if the transistor Q3 is kept off, since the power is supplied from the regulator 11 to the LED driver 18, the controller 14 uses the LED 19 to notify the user of the error.

If the transmitted error state is minor, while the controller 14 is operating with the operation power supplied from the external device CG, the controller 14 controls the transistor Q3 to restore the internal power supply BAT from the excessive discharging state. Even in this state, the controller 14 can control the transistor Q3 in accordance with the dropper method. Note that before at least the voltage of the internal power supply BAT is equal to or higher than the discharge end voltage, the controller 14 may control the transistor Q3 so that the voltage and current supplied to the internal power supply BAT are lower and smaller than those in the normal operation. Note that as a detailed example, the normal operation indicates the time when the voltage of the internal power supply BAT is equal to or higher than the discharge end voltage.

Figure 4:
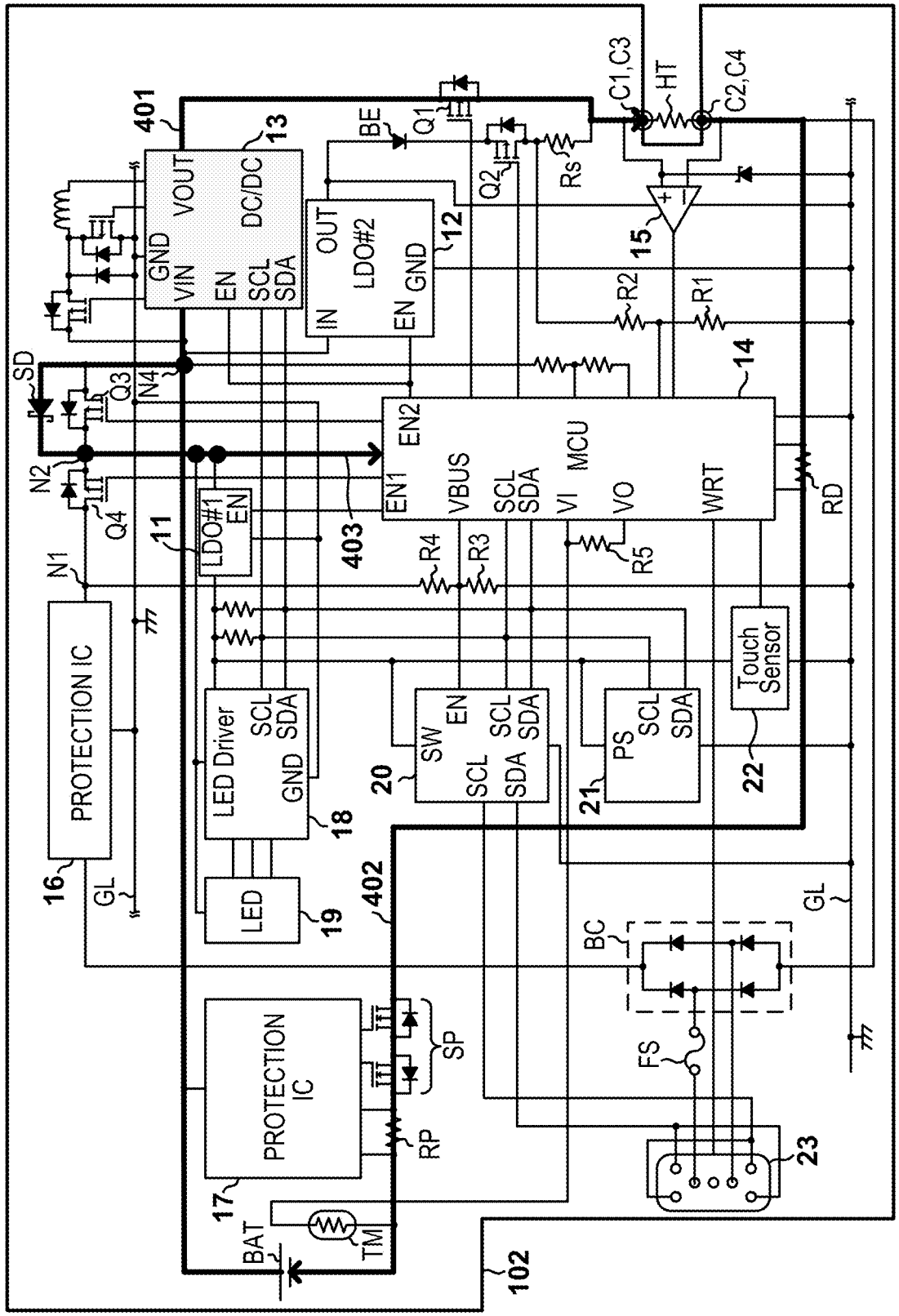
FIG. 4 is a diagram for explaining a current when the internal power supply of the embodiment of the present disclosure is discharged.

The flow of a current when the power supply potential is not supplied from the external device CG to the power supply unit 102 will be described with reference to FIG. 4. When the controller 14 instructs to cause the external device CG not to supply the power supply potential or the external device CG is not connected to the power supply unit 102, the power supply potential is not supplied from the external device CG to the power supply unit 102.

The current flowing out from the positive electrode of the internal power supply BAT is supplied to the power supply terminal of the controller 14 via the power supply path 403 passing in the order of a node N4, the Schottky diode SD, and the node N2. By this current, the controller 14 receives the operation power. Since the forward resistance of the Schottky diode SD is lower than the forward resistance of the transistor Q3, the current mainly flows in the Schottky diode SD from the node N4 to the node N2. By arranging the Schottky diode SD in this manner, the power can be supplied to the controller 14 with a higher efficiency (that is, a low loss) than a case in which the current flows to the parasitic diode of the transistor Q3.

The node N2 is also connected to the input terminal of the regulator 11, the power supply terminal of the LED driver 18, and the power supply terminal of the LED 19. When the node N2 is set at high level, the operation power is supplied to each of the LED driver 18 and the LED 19. The controller 14 supplies the high-level signal to the enable terminal of the regulator 11. Accordingly, the regulator 11 supplies the operation power to each of the power supply terminal of the switch unit 20, the power supply terminal of the puff sensor 21, and the power supply terminal of the touch sensor 22.

The parasitic diode of the transistor Q4 is arranged on a path between the node N2 and the connector 23. The reverse direction of the parasitic diode of the transistor Q4 is a direction from the node N2 to the connector 23. For this reason, no current flows from the node N2 to the connector 23. In this manner, the parasitic diode of the transistor Q4 functions as a reverse flow prevention element. That is, the transistor Q4 serves as the reverse flow prevention element and also serves as an element for suppressing heating of the transistor Q3 at the time of charging. The transistor Q4 is an element for suppressing the concentration of heat in the power supply unit 102 at the time of charging. Since the current does not flow from the node N2 to the node N1, when the power supply potential is not supplied from the external device CG to the power supply unit 102, the potential of the node N1 is set at low level, and accordingly the low-level signal is supplied to the enable terminal of the switch unit 20. For this reason, the switch unit 20 sets the communication path between the connector 23 and the controller 14 to the disconnected state. As a result, the communication terminal of the connector 23 is set in a state in which the communication terminal of the controller 14 is disconnected from the communication terminal of another circuit component (for example, the puff sensor 21). For this reason, even if static electricity is applied to the communication terminal of the connector 23 or the communication terminal is short-circuited, no unexpected current flows in the circuit components in the power supply unit 102. Therefore, the safety of the power supply unit 102 can be improved.

Even if the communication path between the connector 23 and the controller 14 is set in the disconnected state, the controller 14 can communicate with another circuit component (for example the puff sensor 21) in the power supply unit 102. That is, in both a case in which the communication path between the connector 23 and the controller 14 is set in the conductive state and a case in which this communication path is set in the disconnected state, the communication terminal of the controller 14 and the communication path of another integrated circuit (for example, the puff sensor 21) are set in the conductive state. Note that another switch unit may be arranged in the communication path between the controller 14 and the other integrated circuit, and the state may be switched independently of the communication path between the connector 23 and the controller 14.

When heating the heater HT, the controller 14 turns on the transistor Q1. Accordingly, a current flows from the positive electrode of the internal power supply BAT to the heater HT via a power supply path 401. The power supply path 401 is a path from the positive electrode of the internal power supply BAT to the electrical contact C1 via the voltage converter 13. The power supply path 401 does not pass through the transistor Q3. Accordingly, since a decrease in power supplied from the internal power supply BAT to the heater HT can be suppressed, high-efficiency aerosol generation is possible. In particular, if the voltage converter 13 is formed by a boost DC/DC converter or a buck-boost DC/DC converter, a higher voltage can be supplied to the heater HT. The amount of aerosol to be generated can be increased.

The current passing through the heater HT flows into the negative electrode of the internal power supply BAT via the power supply path 402. The power supply path 402 is a path from the electrical contact C2 to the negative electrode of the internal power supply BAT via the resistor RD, the transistor pair SP, and the resistor RP. Since the negative electrode of the internal power supply BAT is not connected to the ground line GL, the current passing through the heater HT passes through the resistor RD and the resistor RP as described above.

The protection IC 17 measures a voltage across the resistor RP to determine the value of a current flowing through the resistor RP based on the measured voltage. The protection IC 17 stops the supply of the power from the internal power supply BAT to the heater HT based on this current value. For example, if this current value exceeds the threshold, the protection IC 17 turns off both the transistors of the transistor pair SP, and the current flowing through the power supply path 402 can be cut off.

The controller 14 measures a voltage across the resistor RD to determine the value of a current flowing through the resistor RD based on the measured voltage. The controller 14 stops the supply of power from the internal power supply BAT to the heater HT based on this current value. For example, if this current value exceeds the threshold, the controller 14 turns off the transistor Q1 and/or stops supplying the enable signal from the control terminal ("EN2" in FIG. 2) to the enable terminal ("EN" in FIG. 2) of the voltage converter 13, the controller 14 cuts off the current flowing through the power supply path 401. In this manner, when the current flowing through the power supply path 302 is monitored by both the protection IC and the controller 14, the safety of the power supply unit 102 can be further improved. Instead, only one of the resistor RP and the resistor RD may be arranged on the power supply path 402.

In the above embodiment, the resistor RP and the resistor RD are arranged in the common portion between the power supply path 302 and the power supply path 402. Instead, at least one of the resistor RP and the resistor RD may be arranged to pass through only one of the power supply path 302 and the power supply path 402. In addition, the power supply unit 102 need not monitor the current passing through the resistor RP and the resistor RD. In addition, the resistor RP or the resistor RD may be arranged in the power supply path 401. On the other hand, as in the embodiment shown in FIG. 2, if the resistor RP and the resistor RD are arranged in the common portion between the power supply path 302 and the power supply path 402, the common mode voltage of the operational amplifier can be set low or zero. If the common mode voltage is low, a wide variety of choices can be set for the differential amplifier, which is advantageous from the viewpoint of cost. In this embodiment, each of the protection IC 17 and the controller 14 may include an operational amplifier for acquiring the voltage applied to the resistor RP and the resistor RD.

In the above embodiment, the transistor Q4 may be located at another position. For example, the transistor Q4 may be arranged between the polarity unification circuit BC and the protection IC 16. In addition, the protection IC 16 may be located at another position. For example, the protection IC 16 may be arranged between the node N1 and the transistor Q4.

The polarity unification circuit BC and the connector 23 will be described in detail with reference to FIGS. 5A and 5B. Some circuit components in FIG. 2 are not illustrated in FIGS. 5A and 5B. The connector 23 of the power supply unit 102 can be connected to the external device CG (more specifically, its connector 24). The connector 23 includes a write terminal 501, two power supply terminals 502 and 503, and four communication terminals 504 to 507. The write terminal 501 is a terminal used to cause the external device CG to write data in the controller 14 of the power supply unit 102. The power supply terminals 502 and 503 are terminals used to cause the power supply unit 102 to receive supply of the power from the external device CG. The communication terminals 504 to 507 are terminals used to cause the controller 14 of the power supply unit 102 to communicate with the external device CG. As described above, in some embodiments, communication between the power supply unit 102 and the external device CG is performed by the I2C communication. The communication terminals 504 and 505 are used to communicate the clock signal in the I2C communication. The communication terminals 506 and 507 are used to communicate the data signal in the I2C communication.

The write terminal 501 of the connector 23 is connected to a write terminal 553 of the controller 14. Both the power supply terminals 502 and 503 of the connector 23 are connected to the polarity unification circuit BC. The communication terminals 504 and 505 of the connector 23 are connected to a terminal 541 of the switch unit 20. Both the communication terminals 506 and 507 of the connector 24 are connected to a terminal 542 of the switch unit 20.

A terminal 543 of the switch unit 20 is connected to the communication terminal 551 of the controller 14. A terminal 544 of the switch unit 20 is connected to the communication terminal 552 of the controller 14. The switch unit 20 includes a switch 546 connected between the terminal 541 and the terminal 543 and a switch 547 connected between the terminal 542 and the terminal 544. When the switch 546 is set ON, the path between the terminal 541 and the terminal 543 is set in the conductive state. When the switch 546 is set OFF, the path between the terminal 541 and the terminal 543 is set in the disconnected state. When the switch 547 is set ON, the path between the terminal 542 and the terminal 544 is set in the conductive state. When the switch 547 is set OFF, the path between the terminal 542 and the terminal 544 is set in the disconnected state. When a high-level signal is input to the enable terminal EN, the switch unit 20 turns on the switches 546 and 547. When a low-level signal is input to the enable terminal EN, the switch unit 20 turns off the switches 546 and 547.

A communication path 571 for communicating the clock signal is formed between the communication terminal 504 of the connector 23 and a communication terminal 551 of the controller 14. Since the switch 546 is positioned on this communication path 571, if the switch 546 is turned on, the communication path 571 is set in the conductive state. If the switch 546 is turned off, the communication path 571 is set in the disconnected state. Of the communication path 571, the communication terminal 505 of the connector 23 is connected to a node 536 between the communication terminal 504 of the connector 23 and the switch 546. Therefore, the clock signal transmitted from the communication terminal 551 of the controller 14 is output from both the communication terminal 504 and the communication terminal 505 of the connector 23.

A communication path 572 for communicating the data signal is formed between the communication terminal 506 of the connector 23 and a communication terminal 552 of the controller 14. Since the switch 547 is positioned on this communication path 572, if the switch 547 is turned on, the communication path 572 is set in the conductive state. If the switch 547 is turned off, the communication path 572 is set in the disconnected state. Of the communication path 572, the communication terminal 507 of the connector 23 is connected to a node 535 between the communication terminal 506 of the connector 23 and the switch 547. Therefore, the data signal transmitted from the communication terminal 552 of the controller 14 is output from both the communication terminal 506 and the communication terminal 507 of the connector 23.

The connector 24 of the external device CG includes a write terminal 511, two power supply terminals 512 and 513, and four communication terminals 514 to 517. The write terminal 511 is a terminal used to cause the external device CG to write data in the controller 14 of the power supply unit 102. The write terminal 511 is connected to a write terminal 583 of a controller 580 of the external device CG. The power supply terminals 512 and 513 are terminals used to cause the external device CG to supply power to the power supply unit 102. The external device CG (more specifically, its voltage generation circuit 590) supplies the power supply potential to the power supply terminal 512. The power supply terminal 513 is connected to ground of the external device CG. The communication terminals 514 to 517 are terminals used to cause the external device CG to communicate with the controller 14 of the power supply unit 102. The communication terminals 514 and 515 are used to communicate the clock signal in the I2C communication. The communication terminals 516 and 517 are used to communicate the data signal in the I2C communication. Both the communication terminals 514 and 515 of the connector 24 are connected to a communication terminal 581 of the controller 580 of the external device CG. Both the communication terminals 516 and 517 of the connector 24 are connected to a communication terminal 582 of the controller 580 of the external device CG.

The connector 23 and the connector 24 can be connected in two different directions. More specifically, the connector 23 and the connector 24 are connectable in a direction indicated in FIG. 5A and a direction indicated in FIG. 5B. The direction of the connector 24 in FIG. 5B is a direction 180° rotated from the direction of the connector 24 in FIG. 5A.

Figure 5A:
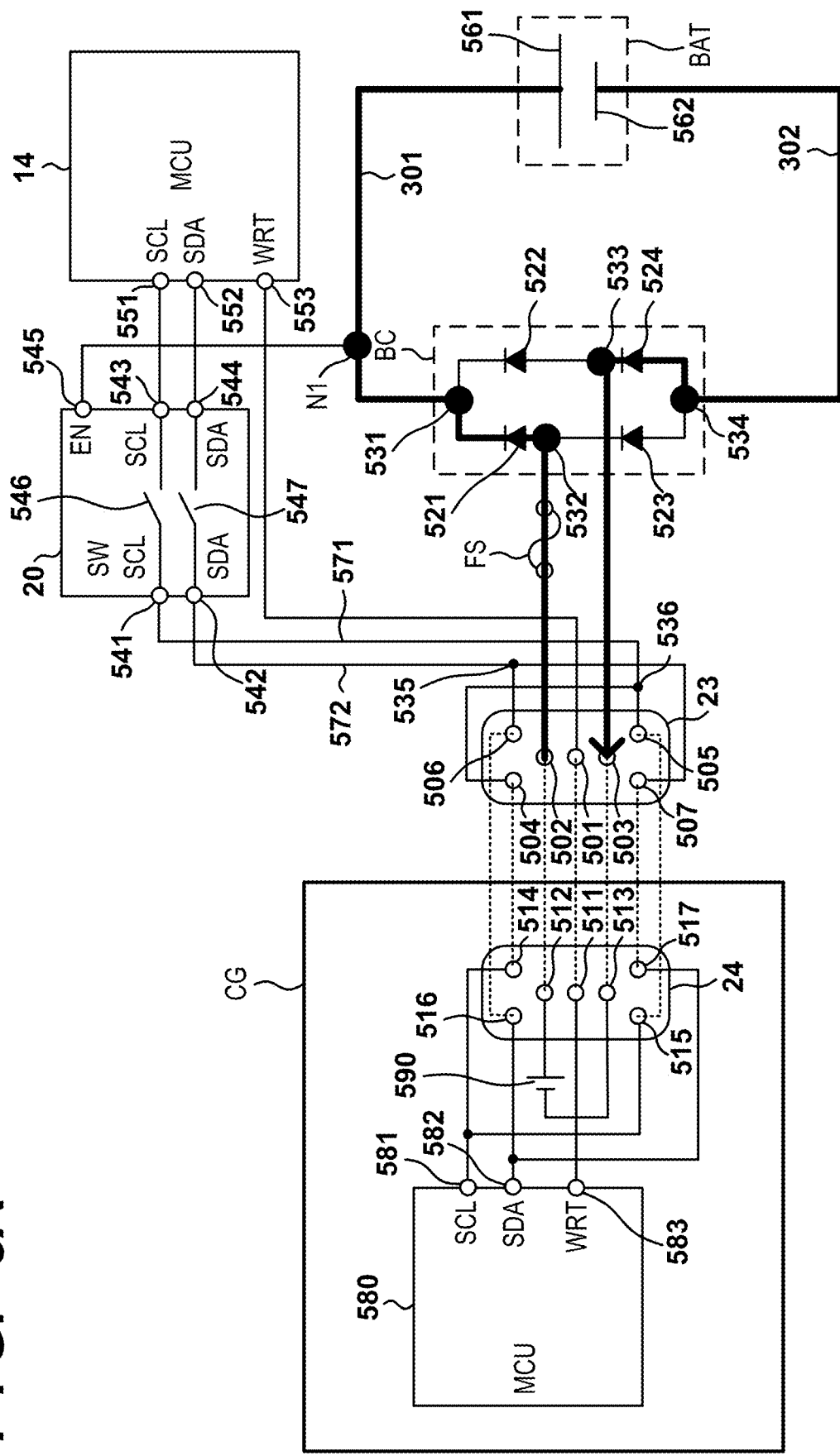
FIGS. 5A and 5B are diagrams for explaining the connector and polarity unification circuit of the embodiment of the present disclosure in detail.

If the connector 23 is connected to the connector 24 in the direction indicated in FIG. 5A, the respective terminals of the two connectors are connected indicated by broken lines in FIG. 5A. More specifically, the write terminal 501 is connected to the write terminal 511, the power supply terminal 502 is connected to the power supply terminal 512, the power supply terminal 503 is connected to the power supply terminal 513, the communication terminal 504 is connected to the communication terminal 514, the communication terminal 505 is connected to the communication terminal 515, the communication terminal 506 is connected to the communication terminal 516, and the communication terminal 507 is connected to the communication terminal 517. In this case, the power supply potential is supplied to the power supply terminal 502 of the connector 23, and the ground potential is supplied to the power supply terminal 503 of the connector 23.

Figure 5B:
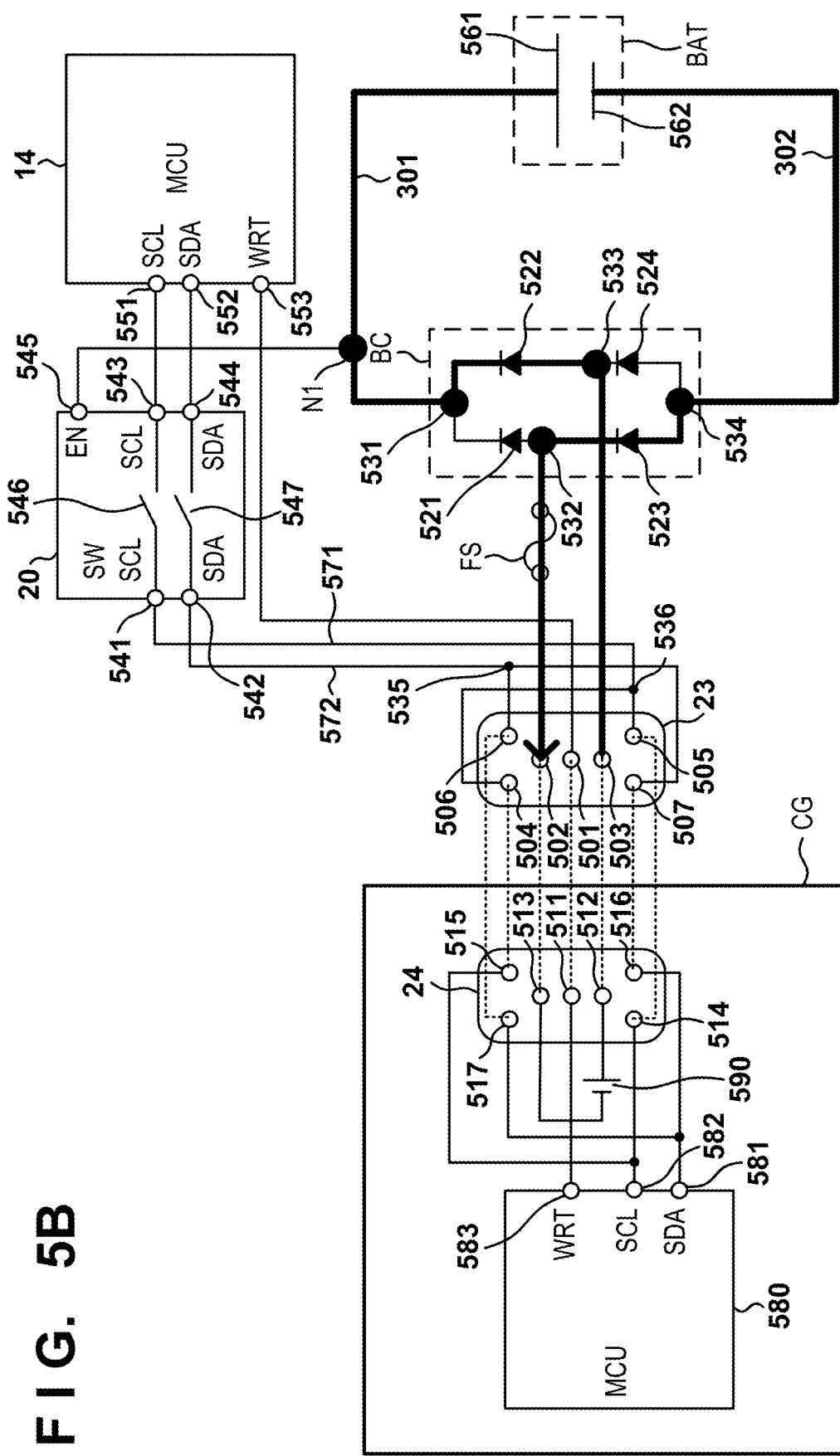

When the connector 23 is connected to the connector 24 in the direction indicated in FIG. 5B, the respective terminals of the two connectors are connected as indicated by the broken lines in FIG. 5B. More specifically, the write terminal 501 is connected to the write terminal 511, the power supply terminal 502 is connected to the power supply terminal 513, the power supply terminal 503 is connected to the power supply terminal 512, the communication terminal 504 is connected to the communication terminal 515, the communication terminal 505 is connected to the communication terminal 514, the communication terminal 506 is connected to the communication terminal 517, and the communication terminal 507 is connected to the communication terminal 516. In this case, the power supply potential is supplied to the power supply terminal 503 of the connector 23, and the ground potential is supplied to the power supply terminal 502 of the connector 23.

Since the write terminal 501 is positioned at the center of the connector 23 and the write terminal 511 is positioned at the center of the connector 24, the write terminal 501 and the write terminal 511 are connected regardless of the direction of connecting the connector 23 and the connector 24. For this reason, the data output from the write terminal 511 of the controller 580 of the external device CG is written in the write terminal 553 of the controller 14 of the power supply unit 102 regardless of the direction of connecting the connector 23 and the connector 24. As described above, when the terminals are located at the centers of the connectors 23 and 24, the number of terminals required to allow connection in the plurality of directions can be reduced.

All the communication terminals 504 and 505 of the connector 23 and the communication terminals 514 and 515 of the connector 24 are used for communicating the clock signal. Regardless of the direction of connecting the connector 23 and the connector 24, the clock signal is communicated between the communication terminal 581 of the controller 580 of the external device CG and the communication terminal 551 of the controller 14 of the power supply unit 102. All the communication terminals 506 and 507 of the connector 23 and the communication terminals 516 and 517 of the connector 24 are used for communicating the data signal. Regardless of the direction of connecting the connector 23 and the connector 24, the data signal is communicated between the communication terminal 582 of the controller 580 of the external device CG and the communication terminal 552 of the controller 14 of the power supply unit 102.

In this embodiment, each of the connector 23 and the connector 24 includes two communication terminals used to communicate the clock signal and two communication terminals used to communicate the data signal. Instead, one of the connector 23 and the connector 24 may include one communication terminal used to communicate the clock signal and/or one communication terminal used to communicate the data signal.

If the connector 23 includes only the communication terminal 504 as the communication terminal used to communicate the clock signal, the communication terminal 504 is connected to the communication terminal 514 if the connector 23 and the connector 24 are connected in the direction indicated in FIG. 5A. If the connector 23 is connected to the connector 24 in the direction indicated in FIG. 5B, the communication terminal 504 is connected to the communication terminal 515. If the connector 23 includes only the communication terminal 505 as the communication terminal used to communicate the clock signal, the communication terminal 505 is connected to the communication terminal 515 if the connector 23 and the connector 24 are connected in the direction indicated in FIG. 5A. If the connector 23 is connected to the connector 24 in the direction indicated in FIG. 5B, the communication terminal 505 is connected to the communication terminal 514. If the connector 23 includes only the communication terminal 506 as the communication terminal used to communicate the data signal, the communication terminal 506 is connected to the communication terminal 516 if the connector 23 and the connector 24 are connected in the direction indicated in FIG. 5A. If the connector 23 is connected to the connector 24 in the direction indicated in FIG. 5B, the communication terminal 506 is connected to the communication terminal 517. If the connector 23 includes only the communication terminal 507 as the communication terminal used to communicate the data signal, the communication terminal 506 is connected to the communication terminal 517 if the connector 23 and the connector 24 are connected in the direction indicated in FIG. 5A. If the connector 23 is connected to the connector 24 in the direction indicated in FIG. 5B, the communication terminal 507 is connected to the communication terminal 516. Even if the connector 23 includes one communication terminal used to communicate the clock signal and/or the communication terminal used to communicate the data signal, and if the connector 24 includes two communication terminals used to communicate the clock signal and/or two communication terminals used to communicate the data signal, the communication is possible between the controller 580 of the external device CG and the controller 14 of the power supply unit 102 regardless of the direction of connecting the connector 23 and the connector 24.

If the connector 24 includes only the communication terminal 514 as the communication terminal used to communicate the clock signal, the communication terminal 514 is connected to the communication terminal 504 if the connector 23 and the connector 24 are connected in the direction indicated in FIG. 5A. If the connector 23 is connected to the connector 24 in the direction indicated in FIG. 5B, the communication terminal 514 is connected to the communication terminal 505. If the connector 23 includes only the communication terminal 515 as the communication terminal used to communicate the clock signal, the communication terminal 515 is connected to the communication terminal 505 if the connector 23 and the connector 24 are connected in the direction indicated in FIG. 5A. If the connector 23 is connected to the connector 24 in the direction indicated in FIG. 5B, the communication terminal 515 is connected to the communication terminal 504. If the connector 23 includes only the communication terminal 516 as the communication terminal used to communicate the data signal, the communication terminal 516 is connected to the communication terminal 506 if the connector 23 and the connector 24 are connected in the direction indicated in FIG. 5A. If the connector 23 is connected to the connector 24 in the direction indicated in FIG. 5B, the communication terminal 516 is connected to the communication terminal 507. If the connector 23 includes only the communication terminal 517 as the communication terminal used to communicate the data signal, the communication terminal 517 is connected to the communication terminal 507 if the connector 23 and the connector 24 are connected in the direction indicated in FIG. 5A. If the connector 23 is connected to the connector 24 in the direction indicated in FIG. 5B, the communication terminal 517 is connected to the communication terminal 506. Even if the connector 24 includes one communication terminal used to communicate the clock signal and/or the communication terminal used to communicate the data signal, and if the connector 23 includes two communication terminals used to communicate the clock signal and/or two communication terminals used to communicate the data signal, the communication is possible between the controller 580 of the external device CG and the controller 14 of the power supply unit 102 regardless of the direction of connecting the connector 23 and the connector 24.

The polarity unification circuit BC includes four diodes 521 to 524 and four nodes 531 to 534. The node 531 is connected to the cathode of the diode 521 and the cathode of the diode 522. The node 534 is connected to the anode of the diode 523 and the anode of the diode 524. The node 532 is connected to the power supply terminal 502 of the connector 23, the anode of the diode 521, and the cathode of the diode 523. The node 533 is connected to the power supply terminal 503 of the connector 23, the anode of the diode 522, and the cathode of the diode 524.

When the connector 23 is connected to the connector 24 in the direction indicated in FIG. 5A, a current flows from the power supply terminal 512 of the connector 24 of the external device CG to a positive electrode 561 of the internal power supply BAT via the diode 521 and the node 531 (that is, in the power supply path 301), and a current flows from a negative electrode 562 of the internal power supply BAT to the power supply terminal 513 of the connector 24 of the external device CG via the node 534 and the diode 524 (that is, in the power supply path 302). When the connector 23 is connected to the connector 24 in the direction indicated in FIG. 5B, a current flows from the power supply terminal 512 of the connector 24 of the external device CG to the positive electrode 561 of the internal power supply BAT via the diode 522 and the node 531 (that is, in the power supply path 301), and a current flows from the negative electrode 562 of the internal power supply BAT to the power supply terminal 513 of the connector 24 of the external device CG via the node 534 and the diode 523 (that is, in the power supply path 302). As described above, regardless of the direction of connecting the connector 23 to the connector 24, the power can be supplied from the external device CG to the internal power supply BAT. Note that if part of the power supply path 302 is set at the same potential as the ground potential of the external device CG, the current flowing out from the power supply terminal 512 of the connector 24 does not flow into ground of the external device CG, but flows in part of the power supply path 302 which is set at the same potential as the ground potential of the external device CG. This also applies to the flow of the current shown in FIG. 3.

In this embodiment, the power supply unit 102 includes the fuse FS arranged on the path between the node 532 and the power supply terminal 502. For this reason, when an excessive current flows in the power supply path 301 (in the case of FIG. 5A) or the power supply path 302 (in the case of FIG. 5B), the fuse FS is disconnected, and the power supply is stopped. Accordingly, the safety of the power supply unit 102 can be improved. A fuse may be arranged on the path between the node 533 and the power supply terminal 503 in addition to or in place of the fuse FS arranged on the path between the node 532 and the power supply terminal 502. If the fuses are arranged on the path between the node 532 and the power supply terminal 502 and the path between the node 533 and the power supply terminal 503, the safety of the power supply unit 102 can be further improved. On the other hand, if the fuse is arranged on one of the path between the node 532 and the power supply terminal 502 and the path between the node 533 and the power supply terminal 503, the safety of the power supply unit 102 can be improved, and at the same time the cost can be reduced. In this embodiment, the fuse FS is arranged on the path between the node 532 and the power supply terminal 502. In place of this, the fuse FS may be arranged at any position of the power supply path 301 and the power supply path 302. Regardless of the position of the fuse, an excessive current can be suppressed.

As described above, whether the current supplied from the power supply terminal 512 of the connector 24 passes through the path connecting the power supply terminal 502 and the node 532 or the path connecting the power supply terminal 503 and the node 533 is determined depending on the direction of connecting the connector 23 and the connector 24. That is, when the connector 23 is connected to the connector 24 in the direction indicated in FIG. 5A, a current supplied from the power supply terminal 512 of the connector 24 flows through a path connecting the power supply terminal 502 and the node 532. when the connector 23 is connected to the connector 24 in the direction indicated in FIG. 5B, a current supplied from the power supply terminal 512 of the connector 24 flows through a path connecting the power supply terminal 503 and the node 533. When the connector 23 is connected to the connector 24 in the direction indicated in FIG. 5A and the fuse FS is arranged on the path connecting the power supply terminal 502 and the node 532, another element present on the power supply path 301 and the power supply path 302 can be appropriately protected from the excessive current. However, when the connector 23 is connected to the connector 24 in the direction indicated in FIG. 5B and the fuse FS is arranged on the path connecting the power supply terminal 503 and the node 533, the current flows to the other element present on the power supply path 301 and the power supply path 302 until the fuse FS is disconnected. When the connector 23 is connected to the connector 24 in the direction indicated in FIG. 5A and the fuse FS is arranged on only the path connecting the power supply terminal 503 and the node 533, the same phenomenon described above occurs. If the fuses FZ are arranged on the path connecting the power supply terminal 502 and the node 532 and the path connecting the power supply terminal 503 and the node 533, this phenomenon can be prevented. However, if the plurality of fuses are provided, the volume of the power supply unit 102 may increase.

Instead of using the plurality of fuses, if the protection IC 16 is arranged between the polarity unification circuit BC and the node N2 as shown in FIG. 2, an element connected to the output side of the protection IC 16 can be protected regardless of the direction of connecting the connector 23 and the connector 24. If the protection IC 16 and the fuse FS are provided, and even if any trouble occurs in the protection IC 16, an excessive current can be suppressed. In addition, if the transistor Q4 is located downstream of the protection IC 16 when viewed from the flow of the current supplied from the polarity unification circuit BC, power supply from the internal power supply BAT to the protection IC 16 can be suppressed. Therefore, the operation or failure of the protection IC 16 can be suppressed.

Among protection elements including the fuse FS, the protection IC 16, and the transistor Q4, the fuse FS may be arranged between the connector 23 and the polarity unification circuit BC, and the protection IC 16 and the transistor Q4 may be arranged between the polarity unification circuit BC and the node N2. In addition, when viewed from the flow of the current supplied from the polarity unification circuit BC, the transistor Q4 may be located downstream of the protection IC 16.

As has been described above, the power supply unit 102 has the above-described arrangement of the connector 23 and the above-described arrangement of the polarity unification circuit BC. Accordingly, the connector 23 of the power supply unit 102 can be connected in any one of the two directions of the connector 24 of the external device CG, thereby improving convenience of the user.

SUMMARY OF EMBODIMENTS

Item 1. A power supply unit (102) for an aerosol generation device (100), the power supply unit (102) comprising:

an internal power supply (BAT) configured to hold power supplied to a heater (HT) configured to heat an aerosol source;
a first connector (23) connectable to an external power supply (CG) including a second connector (24) including a first power supply terminal (512) and a second power supply terminal (513), the first connector (23) including a third power supply terminal (502) and a fourth power supply terminal (503); and
a polarity unification circuit (BC), wherein
the polarity unification circuit (BC) includes
  a first diode (521), a second diode (522), a third diode (523), and a fourth diode (524),
  a first node (531) connected to a cathode of the first diode (521) and a cathode of the second diode (522),
  a second node (534) connected to an anode of the third diode (523) and an anode of the fourth diode (524),
  a third node (532) connected to the third power supply terminal (502) of the first connector (23), an anode of the first diode (521), and a cathode of the third diode (523), and
  a fourth node (533) connected to the fourth power supply terminal (503) of the first connector (23), an anode of the second diode (522), and a cathode of the fourth diode (524),
in a case in which the first connector (23) is connected to the second connector (24) of the external power supply (CG) in a first direction, the third power supply terminal (502) of the first connector (23) is connected to the first power supply terminal (512) of the second connector (24), and the fourth power supply terminal (503) of the first connector (23) is connected to the second power supply terminal (513) of the second connector (24),
in a case in which the first connector (23) is connected to the second connector (24) of the external power supply (CG) in a second direction different from the first direction, the fourth power supply terminal (503) of the first connector (23) is connected to the first power supply terminal (512) of the second connector (24), and the third power supply terminal (502) of the first connector (23) is connected to the second power supply terminal (513) of the second connector (24), and
a current flows from the first power supply terminal (512) of the external power supply (CG) to a positive electrode (561) of the internal power supply (BAT) via the first node (531), and a current flows from a negative electrode (562) of the internal power supply (BAT) to the second power supply terminal (513) of the external power supply (CG) via the second node (534).

Item 2. The power supply unit (102) according to Item 1, further comprising a fuse (FS) on at least one of a path between the third node (532) of the polarity unification circuit (BC) and the third power supply terminal (502) of the first connector (23) and a path between the fourth node (533) of the polarity unification circuit (BC) and the fourth power supply terminal (503) of the first connector (23).

Item 3. The power supply unit (102) according to Item 1, further comprising a fuse (FS) on one of a path between the third node (532) of the polarity unification circuit (BC) and the third power supply terminal (502) of the first connector (23) and a path between the fourth node (533) of the polarity unification circuit (BC) and the fourth power supply terminal (503) of the first connector (23).

Item 4. The power supply unit (102) according to any one of Items 1 to 3, further comprising a first protection integrated circuit (16) configured to stop supply of power to the internal power supply (BAT) and arranged on a path between the first node (531) of the polarity unification circuit (BC) and the positive electrode (561) of the internal power supply (BAT).

Item 5. The power supply unit (102) according to any one of Items 1 to 4, further comprising a diode arranged on a path between the first node (531) of the polarity unification circuit (BC) and the positive electrode (561) of the internal power supply (BAT), a forward direction of the diode being a direction from the first node (531) of the polarity unification circuit (BC) to the positive electrode (561) of the internal power supply (BAT).

Item 6. The power supply unit (102) according to any one of Items 1 to 5, further comprising a transistor (Q3) including a parasitic diode arranged on a path between the first node (531) of the polarity unification circuit (BC) and the positive electrode (561) of the internal power supply (BAT), a reverse direction of the parasitic diode being a direction from the first node (531) of the polarity unification circuit (BC) to the positive electrode (561) of the internal power supply (BAT).

Item 7. The power supply unit (102) according to any one of Items 1 to 3, further comprising, on a path between the first node (531) of the polarity unification circuit (BC) and the positive electrode (561) of the internal power supply (BAT):
  a first protection integrated circuit (16) configured to stop supply of power to the internal power supply (BAT);
  a diode whose forward direction is a direction from the first node (531) of the polarity unification circuit (BC) to the positive electrode (561) of the internal power supply (BAT); and
  a transistor (Q3) including a parasitic diode whose reverse direction is a direction from the first node (531) of the polarity unification circuit (BC) to the positive electrode (561) of the internal power supply (BAT),
  in the named order from the first node (531) of the polarity unification circuit (BC) to the positive electrode (561) of the internal power supply (BAT).

Item 8. The power supply unit (102) according to any one of Items 1 to 7, further comprising:
  a first resistor (RP) arranged on a path between the second node (534) of the polarity unification circuit (BC) and the negative electrode (562) of the internal power supply (BAT); and
  a second protection integrated circuit (17) configured to measure a voltage across the first resistor (RP),
  wherein the second protection integrated circuit (17) determines a value of a current flowing through the first resistor (RP) based on the voltage across the first resistor (RP) and stops supply of power from the external power supply (CG) to the internal power supply (BAT) based on the value of the current flowing through the first resistor (RP).

Item 9. The power supply unit (102) according to Item 8, further comprising:
  a second resistor (RD) arranged on a path between the second node (534) of the polarity unification circuit (BC) and the negative electrode (562) of the internal power supply (BAT), the second resistor (RD) being connected to the first resistor (RP) in series; and
  a controller (14) configured to control power supply from the internal power supply (BAT) to the heater (HT),
  wherein the controller (14) measures a voltage across the second resistor (RD), determines a value of a current flowing through the second resistor (RD) based on the voltage across the second resistor (RD), and stops power supply from the external power supply (CG) to the internal power supply (BAT) based on the value of the current flowing through the second resistor (RD).

Item 10. The power supply unit (102) according to any one of Items 1 to 9, wherein the second node (534) of the polarity unification circuit (BC) is not connected to ground of the power supply unit (102).

Item 11. The power supply unit (102) according to any one of Items 1 to 10, wherein
  the first connector (23) further includes a first terminal (501),
  the second connector (24) further includes a second terminal (511), and
  the first terminal (501) of the first connector (23) is connected to the second terminal (511) of the second connector (24) in both a case in which the first connector (23) is connected to the second connector (24) of the external power supply (CG) in the first direction and a case in which the first connector (23) is connected to the second connector (24) of the external power supply (CG) in the second direction.

Item 12. The power supply unit (102) according to Item 11, further comprising a controller (14) configured to control power supply from the internal power supply (BAT) to the heater (HT),
  wherein a third terminal (501) of the first connector (23) is connected to a write terminal of the controller (14).

Item 13. The power supply unit (102) according to any one of Items 1 to 12, wherein
  the first connector (23) further includes a first communication terminal (504) and a second communication terminal (505),
  the second connector (24) further includes a third communication terminal (514),
  in a case in which the first connector (23) is connected to the second connector (24) of the external power supply (CG) in the first direction, the first communication terminal (504) of the first connector (23) is connected to the third communication terminal (514) of the second connector (24), and
  in a case in which the first connector (23) is connected to the second connector (24) of the external power supply (CG) in the second direction, the second communication terminal (505) of the first connector (23) is connected to the third communication terminal (514) of the second connector (24).

The invention is not limited to the foregoing embodiments, and various variations/changes are possible within the spirit of the invention.

What is claimed is:

1. A power supply unit for an aerosol generation device, the power supply unit comprising:
  an internal power supply configured to hold power supplied to a heater configured to heat an aerosol source;
  a first connector connectable to an external power supply including a second connector including a first power supply terminal and a second power supply terminal, the first connector including a third power supply terminal and a fourth power supply terminal; and
  a polarity unification circuit, wherein
  the polarity unification circuit includes
    a first diode, a second diode, a third diode, and a fourth diode,
    a first node connected to a cathode of the first diode and a cathode of the second diode,
    a second node connected to an anode of the third diode and an anode of the fourth diode, a third node connected to the third power supply terminal of the first connector, an anode of the first diode, and a cathode of the third diode, and a fourth node connected to the fourth power supply terminal of the first connector, an anode of the second diode, and a cathode of the fourth diode, in a case in which the first connector is connected to the second connector of the external power supply in a first direction, the third power supply terminal of the first connector is connected to the first power supply terminal of the second connector, and the fourth power supply terminal of the first connector is connected to the second power supply terminal of the second connector, in a case in which the first connector is connected to the second connector of the external power supply in a second direction different from the first direction, the fourth power supply terminal of the first connector is connected to the first power supply terminal of the second connector, and the third power supply terminal of the first connector is connected to the second power supply terminal of the second connector, a current flows from the first power supply terminal of the external power supply to a positive electrode of the internal power supply via the first node, and a current flows from a negative electrode of the internal power supply to the second power supply terminal of the external power supply via the second node, and the power supply unit further comprises a transistor including a parasitic diode arranged on a path between the first node of the polarity unification circuit and the positive electrode of the internal power supply, a reverse direction of the parasitic diode being a direction from the first node of the polarity unification circuit to the positive electrode of the internal power supply.

2. The power supply unit according to claim 1, further comprising a first protection integrated circuit configured to stop supply of power to the internal power supply and arranged on a path between the first node of the polarity unification circuit and the positive electrode of the internal power supply.

3. The power supply unit according to claim 1, further comprising a diode arranged on a path between the first node of the polarity unification circuit and the positive electrode of the internal power supply, a forward direction of the diode being a direction from the first node of the polarity unification circuit to the positive electrode of the internal power supply.

4. The power supply unit according to claim 1, further comprising a fuse on at least one of a path between the third node of the polarity unification circuit and the third power supply terminal of the first connector and a path between the fourth node of the polarity unification circuit and the fourth power supply terminal of the first connector.

5. The power supply unit according to claim 1, further comprising a fuse on one of a path between the third node of the polarity unification circuit and the third power supply terminal of the first connector and a path between the fourth node of the polarity unification circuit and the fourth power supply terminal of the first connector.

6. The power supply unit according to claim 1, wherein the second node of the polarity unification circuit is not connected to ground of the power supply unit.

7. The power supply unit according to claim 1, wherein the first connector further includes a first terminal, the second connector further includes a second terminal, and the first terminal of the first connector is connected to the second terminal of the second connector in both a case in which the first connector is connected to the second connector of the external power supply in the first direction and a case in which the first connector is connected to the second connector of the external power supply in the second direction.

8. The power supply unit according to claim 7, further comprising a controller configured to control power supply from the internal power supply to the heater,
wherein a third terminal of the first connector is connected to a write terminal of the controller.

9. The power supply unit according to claim 1, wherein the first connector further includes a first communication terminal and a second communication terminal, the second connector further includes a third communication terminal, in a case in which the first connector is connected to the second connector of the external power supply in the first direction, the first communication terminal of the first connector is connected to the third communication terminal of the second connector, and in a case in which the first connector is connected to the second connector of the external power supply in the second direction, the second communication terminal of the first connector is connected to the third communication terminal of the second connector.

10. A power supply unit for an aerosol generation device, the power supply unit comprising:

an internal power supply configured to hold power supplied to a heater configured to heat an aerosol source;

a first connector connectable to an external power supply including a second connector including a first power supply terminal and a second power supply terminal, the first connector including a third power supply terminal and a fourth power supply terminal; and a polarity unification circuit, wherein
the polarity unification circuit includes
a first diode, a second diode, a third diode, and a fourth diode,
a first node connected to a cathode of the first diode and a cathode of the second diode,
a second node connected to an anode of the third diode and an anode of the fourth diode,
a third node connected to the third power supply terminal of the first connector, an anode of the first diode, and a cathode of the third diode, and
a fourth node connected to the fourth power supply terminal of the first connector, an anode of the second diode, and a cathode of the fourth diode, in a case in which the first connector is connected to the second connector of the external power supply in a first direction, the third power supply terminal of the first connector is connected to the first power supply terminal of the second connector, and the fourth power supply terminal of the first connector is connected to the second power supply terminal of the second connector, in a case in which the first connector is connected to the second connector of the external power supply in a second direction different from the first direction, the fourth power supply terminal of the first connector is connected to the first power supply terminal of the second connector, and the third power supply terminal of the first connector is connected to the second power supply terminal of the second connector, a current flows from the first power supply terminal of the external power supply to a positive electrode of the internal power supply via the first node, and a current flows from a negative electrode of the internal power supply to the second power supply terminal of the external power supply via the second node, and the power supply unit further comprises:
- a first resistor arranged on a path between the second node of the polarity unification circuit and the negative electrode of the internal power supply;
- a second resistor arranged on a path between the second node of the polarity unification circuit and the negative electrode of the internal power supply, the second resistor being connected to the first resistor in series;
- a second protection integrated circuit configured to measure a voltage across the first resistor; and
- a controller configured to control power supply from the internal power supply to the heater, the second protection integrated circuit determines a value of a current flowing through the first resistor based on the voltage across the first resistor and stops supply of power from the external power supply to the internal power supply based on the value of the current flowing through the first resistor, and the controller measures a voltage across the second resistor, determines a value of a current flowing through the second resistor based on the voltage across the second resistor, and stops power supply from the external power supply to the internal power supply based on the value of the current flowing through the second resistor.

11. A power supply unit for an aerosol generation device, the power supply unit comprising:
- an internal power supply configured to hold power supplied to a heater configured to heat an aerosol source;
- a first connector connectable to an external power supply including a second connector including a first power supply terminal and a second power supply terminal, the first connector including a third power supply terminal and a fourth power supply terminal; and
- a polarity unification circuit, wherein the polarity unification circuit includes
- a first diode, a second diode, a third diode, and a fourth diode,
- a first node connected to a cathode of the first diode and a cathode of the second diode,
- a second node connected to an anode of the third diode and an anode of the fourth diode,
- a third node connected to the third power supply terminal of the first connector, an anode of the first diode, and a cathode of the third diode, and
- a fourth node connected to the fourth power supply terminal of the first connector, an anode of the second diode, and a cathode of the fourth diode, in a case in which the first connector is connected to the second connector of the external power supply in a first direction, the third power supply terminal of the first connector is connected to the first power supply terminal of the second connector, and the fourth power supply terminal of the first connector is connected to the second power supply terminal of the second connector, in a case in which the first connector is connected to the second connector of the external power supply in a second direction different from the first direction, the fourth power supply terminal of the first connector is connected to the first power supply terminal of the second connector, and the third power supply terminal of the first connector is connected to the second power supply terminal of the second connector, and a current flows from the first power supply terminal of the external power supply to a positive electrode of the internal power supply via the first node, and a current flows from a negative electrode of the internal power supply to the second power supply terminal of the external power supply via the second node, the power supply unit further comprises, on a path between the first node of the polarity unification circuit and the positive electrode of the internal power supply:
- a first protection integrated circuit configured to stop supply of power to the internal power supply;
- a diode whose forward direction is a direction from the first node of the polarity unification circuit to the positive electrode of the internal power supply; and
- a transistor including a parasitic diode whose reverse direction is a direction from the first node of the polarity unification circuit to the positive electrode of the internal power supply, in the named order from the first node of the polarity unification circuit to the positive electrode of the internal power supply.

* * * * *